United States Patent
Hammitt et al.

(10) Patent No.: US 10,621,488 B2
(45) Date of Patent: Apr. 14, 2020

(54) CONTENT MANAGEMENT AND DELIVERY SYSTEM

(71) Applicant: Beseeq, Burlingame, CA (US)

(72) Inventors: Lisa C. Hammitt, Burlingame, CA (US); Mark K. Hammitt, Burlingame, CA (US); Rebecca E. Krauthamer, San Francisco, CA (US); Patrick E. Rodriguez, Irvine, CA (US)

(73) Assignee: Beseeq, Burlingame, CA (US)

( * ) Notice: Subject to any disclaimer, the term of this patent is extended or adjusted under 35 U.S.C. 154(b) by 88 days.

(21) Appl. No.: 15/954,183

(22) Filed: Apr. 16, 2018

(65) Prior Publication Data

US 2018/0300751 A1     Oct. 18, 2018

Related U.S. Application Data

(60) Provisional application No. 62/485,965, filed on Apr. 16, 2017.

(51) Int. Cl.
| G06N 3/04 | (2006.01) |
| G06N 3/08 | (2006.01) |
| G06T 17/00 | (2006.01) |
| G06K 9/00 | (2006.01) |
| G06K 9/66 | (2006.01) |
| G06K 9/62 | (2006.01) |

(52) U.S. Cl.
CPC ......... *G06N 3/0454* (2013.01); *G06K 9/0061* (2013.01); *G06K 9/6267* (2013.01); *G06K 9/66* (2013.01); *G06N 3/0472* (2013.01); *G06N 3/08* (2013.01); *G06T 17/00* (2013.01)

(58) Field of Classification Search
CPC combination set(s) only.
See application file for complete search history.

(56) References Cited

U.S. PATENT DOCUMENTS

| 6,603,491 B2 * | 8/2003 | Lemelson | G06F 3/013 |
| | | | 715/784 |
| 2013/0132177 A1 * | 5/2013 | Ha | G06Q 30/02 |
| | | | 705/14.19 |
| 2017/0039876 A1 * | 2/2017 | Alyuz Civitci | G09B 7/00 |

* cited by examiner

*Primary Examiner* — Alexandru Cirnu
(74) *Attorney, Agent, or Firm* — Schwegman Lundberg & Woessner, P.A.

(57) ABSTRACT

Disclosed are systems, methods, and non-transitory computer-readable media for determining user engagement with a content item. A computing device accesses at least one image of eyes of a user that is captured while a client device is presenting a first content item on a display of the client device. The computing device determines, based on using the at least one image as input in a neural network, a gaze of the user. The gaze including coordinates at which the user is looking in relation to the client device. The neural network was trained based on machine generated images of a modeled human user looking at various coordinates. The computing device determines, based on the gaze of the user, an engagement score for the user. The engagement score indicates a level of engagement of the user with the first content item.

17 Claims, 20 Drawing Sheets

700

RECEIVE A CONTENT REQUEST FROM A CLIENT DEVICE, THE CLIENT DEVICE ASSOCIATED WITH A FIRST USER PROFILE
702

GATHER, FROM THE USER PROFILE, DATA DESCRIBING A TASTE PROFILE OF A USER ASSOCIATED WITH THE FIRST USER PROFILE
704

DETERMINE, BASED ON CONTEXTUAL DATA GATHERED BY THE CLIENT DEVICE, A CURRENT CONTEXT OF THE USER
706

DETERMINE, BASED ON SENSOR DATA GATHERED FROM THE CLIENT DEVICE, AN ENGAGEMENT VALUE INDICATING AN ESTIMATED LEVEL AT WHICH THE USER WILL ENGAGE WITH AN INVITATIONAL CONTENT ITEM PRESENTED ON THE CLIENT DEVICE
708

SELECT AN INVITATIONAL CONTENT ITEM BASED ON THE TASTE PROFILE, THE CURRENT CONTEXT OF THE USER, AND THE CURRENT LEVEL OF ENGAGEMENT OF THE USER
710

CAUSE THE INVITATIONAL CONTENT ITEM TO BE PRESENTED ON THE CLIENT DEVICE
712

```
┌─────────────────────────────────────────────────────────────┐
│ WHILE AN INVITATIONAL CONTENT ITEM IS BEING PRESENTED BY A  │
│ CLIENT DEVICE, ANALYZE IMAGE DATA CAPTURED BY THE CLIENT    │
│ DEVICE, YIELDING AN ANALYSIS, THE IMAGE DATA DEPICTING A    │
│ USER OF THE CLIENT DEVICE WHILE THE INVITATION CONTENT ITEM │
│ IS BEING PRESENTED                                          │
│                            802                              │
└─────────────────────────────────────────────────────────────┘
                              │
                              ▼
┌─────────────────────────────────────────────────────────────┐
│ DETERMINE, BASED ON THE IMAGE DATA, AN EMOTIONAL REACTION   │
│ OF THE USER TO THE INVITATIONAL CONTENT ITEM                │
│                            804                              │
└─────────────────────────────────────────────────────────────┘
                              │
                              ▼
┌─────────────────────────────────────────────────────────────┐
│ ADJUST PRESENTATION OF THE INVITATIONAL CONTENT ITEM BASED  │
│ ON THE EMOTIONAL REACTION OF THE USER                       │
│                            806                              │
└─────────────────────────────────────────────────────────────┘
```

CONTENT MANAGEMENT AND DELIVERY SYSTEM

CROSS-REFERENCE TO RELATED APPLICATIONS

The present application claims the benefit of priority of U.S. Provisional Application No. 62/485,965, filed on Apr. 16, 2017, which is incorporated herein by reference in its entirety.

TECHNICAL FIELD

An embodiment of the present subject matter relates generally to content management and, more specifically, to determining user engagement with a content item.

BACKGROUND

Currently, content provided to users is often unread or off-target. For example, brochures are thrown away, display ads get clicked but not read, television ads get skipped, and ads of all types get consumed by people that are unlikely to act on them. With global annual media costs reaching the hundreds of billions, the amount of ignored and incorrectly targeted content results in a huge financial loss. Accordingly, improvements are needed.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

FIG. 7 is a flowchart showing a method for recommending an invitational content item, according to some example embodiments.

FIG. 8 is a flowchart showing a method for adjusting presentation of an invitational content item based on sensor data, according to some example embodiments.

DETAILED DESCRIPTION

Glossary

Figure 1:
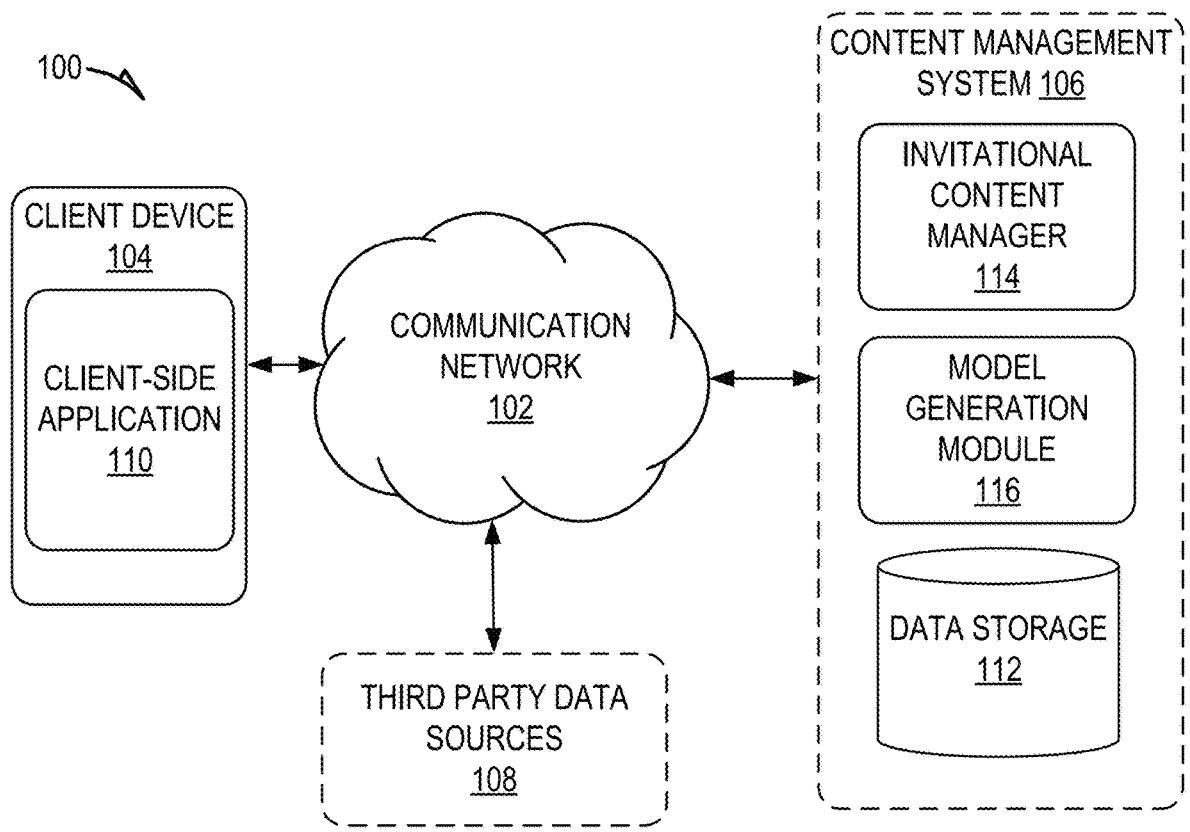
FIG. 1 is a block diagram showing an exemplary system for content management and delivery, according to some example embodiments.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATION NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE)

technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Description

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2018, BESEEQ, All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Drawings

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Disclosed are systems, methods, and computer-readable storage media for determining user engagement with presented invitational content. A content management system provides targeted delivery of invitational content items to users. An invitational content item is any type of content that informs the user about a specified topic, product, or category. For example, invitational content items include videos, text, applications, images, audio, etc., that provide information about a specified topic, product or category. The content management system provides invitational content items to a client device of a user, where the invitational content item is presented to the user.

Marketers invest substantial money into both the design and delivery of invitational content items, and therefore want to ensure that their invitational content items are being delivered to users that are interested and engaged with the subject matter of the invitational content items. To accomplish this, the content management system determines an engagement value that indicates a user's level of engagement with content presented on the user's client device. A user's level of engagement indicates the level at which the user is actively viewing and participating with content presented on their client device. This may include an invitational content item (e.g., an advertisement, sales pitch, etc.), or general content item (e.g., article). For example, a user that is viewing the relevant portion of a video, interacting with user interface elements, and/or is otherwise actively engaged with content is given a high engagement value. Alternatively, a user that is looking away from the screen, has the volume low, and/or is otherwise not actively engaged with the content presented by the client device is given a low engagement value.

The content management system uses a user's engagement value in a variety of ways. For instance, the engagement value may be used to determine the types of invitational content items that the user likes and/or dislikes, which may be used to select a relevant invitational content item to provide to the user. As another example, the engagement value may be used to determine whether or when to present the user with an invitational content item. For example, a marketer may prefer that invitational content items be delivered to a user while the user is actively engaged with content presented on their client device. A user's engagement value may also be used to vary the invitational content item that is being presented to a user. For example, a user that is actively engaged with an invitational content item may be presented with an extended version of the invitational content item or additional features, content, offers associated with the invitational content item. Alternatively, when a user is not actively engaged with an invitational content item, the invitational content item may be cut short or replaced with an alternate invitational content item.

In some embodiments, a marketer may incentivize a user to view an invitational content item. For example, the marketer may offer a user a reward (e.g., monetary reward) for viewing an invitational content item. In this type of situation, the user's engagement value is used to ensure that the user is adequately engaged with the invitational content item to warrant receiving the offered reward. For example, the user's engagement value is determined and monitored throughout presentation of the invitational content item and compared to a threshold engagement value. The user is granted the reward if the user's engagement value meets or transgresses (i.e., exceeds) the threshold engagement value throughout presentation of the invitational content item. Alternatively, if the user's engagement value falls below the threshold engagement value, the user may be granted only a portion of the award, or none of the award.

The user's engagement value may further be used to select an award to offer a user in exchange for viewing an invitational content item. For example, a user with a high engagement value, either current or historical, may be offered a higher reward than a user that has a lower engagement value. This benefits both marketers and the users. For example, marketers benefit by providing users with a reward that is commensurate with the engagement the user is expected to provide. Users benefit by being incentivized by increasing their level of engagement.

The content management system determines an engagement value based on a variety of factors, such as a determined gaze of the user, auditory assessment, emotional assessment, response to visual challenges, response to offers, etc. The gaze of the user indicates coordinates at which the user is looking relative to a client device. The content management system determines the gaze of a user using images of the user's eyes as input into a neural network that outputs the coordinates at which the user is looking. The neural network is trained using images of users looking at various coordinates in relation to a client device.

One issue with training a neural network is creating adequate training data. For example, to train a neural network to output coordinates based on an image of a user requires multiple training images of users looking at various known coordinates. To alleviate this issue, the content management system generates training data for the neural network. That is, the content management system generates images of users looking at known coordinates. For example, the content management system utilizes a three-dimensional model of a user to generate images of a virtual user looking at various coordinates. This allows the content management system to generate a large amount of training data to train the neural network.

FIG. 1 is a block diagram showing an exemplary system 100 for content management and delivery, according to some example embodiments. While the shown system 100 employs a client-server architecture, the present inventive subject matter is, of course, not limited to such an architecture, and could equally well find application in an event-driven, distributed, or peer-to-peer architecture system, for example. Moreover, it shall be appreciated that although the various functional components of the system 100 are discussed in a singular sense, multiple instances of one or more of the various functional components may be employed.

As shown, the system 100 includes multiple computing devices connected to a communication network 102 and configured to communicate with each other through use of the communication network 102. The communication network 102 is any type of network, including a local area network ("LAN"), such as an intranet, a wide area network ("WAN"), such as the internet, or any combination thereof. Further, the communication network 102 is a public network, a private network, or a combination thereof. The communication network 102 is implemented using any number of communication links associated with one or more service providers, including one or more wired communication links, one or more wireless communication links, or any combination thereof. Additionally, the communication network 102 is configured to support the transmission of data formatted using any number of protocols.

Multiple computing devices can be connected to communication network 102. A computing device is any type of general computing device capable of network communication with other computing devices. For example, a computing device can be a personal computing device such as a desktop or workstation, a business server, or a portable computing device, such as a laptop, smart phone, or a tablet PC. A computing device includes some or all of the features, components, and peripherals of computing device 1900 of FIG. 19.

To facilitate communication with other computing devices, a computing device includes a communication interface configured to receive a communication, such as a request, data, etc., from another computing device in network communication with the computing device and pass the communication along to an appropriate module running on the computing device. The communication interface is configured to send a communication to another computing device in network communication with the computing device.

As shown, the system 100 includes a client device 104, a content management system 106 and third-party data sources 108. In the system 100, a user interacts with the content management system 106 through the client device 104 connected to the communication network 102 by direct and/or indirect communication. The client device 104 is any of a variety of types of computing devices that include at least a display, a computer processor, and communication capabilities that provide access to the communication network 102 (e.g., a smart phone, a tablet computer, a personal digital assistant (PDA), a personal navigation device (PND), a handheld computer, a desktop computer, a laptop or netbook, or a wearable computing device).

The client device 104 includes multiple sensors that gather contextual data. For example, the sensors include a front facing and rear facing camera configured to capture image data, a microphone configured to capture audio data, accelerometer and gyroscope configured to capture movement data, a compass and Global Positioning System (GPS) component configured to capture location and directional data, touch sensor to capture a user fingerprint, etc.

The third party data sources 108 include multiple web servers that are available via communication network 102. The third party data sources 108 include social networking services, such as Facebook, Pinterest, Instagram, etc., as well as any other type of online web service, such as websites associated with brands and marketers, weather services, financial services, etc. The third party data sources 108 are accessible to client device 104 and content management system 106 via communication network 102. Although the third party data sources 108 are shown as a single entity, this is only for ease of explanation and is not meant to be limiting. The third party data sources 108 may include any number of services, web servers, computing device, etc., and this disclosure anticipates all such embodiments.

The content management system 106 consists of one or more computing devices and supports connections from a variety of different types of client devices 104, such as desktop computers; mobile computers; mobile communications devices (e.g. mobile phones, smart phones, tablets, etc.); smart televisions; set-top boxes; and/or any other network enabled computing devices. The client device 104 can be of varying type, capabilities, operating systems, etc. Furthermore, the content management system 106 may concurrently accept connections from and interact with multiple client devices 104.

A user interacts with content management system 106 via a client-side application 110 installed on the client device 104. The client-side application 110 may include a content management system 106 specific component, such as a stand-alone application, one or more application plug-ins, and/or a browser extension. However, the client-side application 110 may also be a third-party application, such as a web browser, that resides on the client device 104 and is configured to communicate with the content management system 106. In either case, the client-side application 110 presents a user interface (UI) for the user to interact with the content management system 106.

The content management system 106 includes a data storage 112 to store data. The data storage 112 stores any type of data or content, such as digital data, documents, text files, audio files, video files, apps, etc. The data storage 112 can be a storage device, multiple storage devices, or one or more servers. Alternatively, the data storage 112 can be a cloud storage provider or network storage. The data storage 112 can store data in a network accessible storage (SAN) device, in a redundant array of inexpensive disks (RAID), etc. The data storage 112 can store data items using one or more partition types, such as FAT, FAT32, NTFS, EXT2, EXT3, EXT4, ReiserFS, BTRFS, and so forth.

The content management system 106 includes an invitational content manager 114 configured to manage selection, delivery and presentation of invitational content items on the client device 104. Although the invitational content manager 114 is shown as being present in the content management system 106, this is just for ease of explanation and is not meant to be limiting. The functionality of the invitational content manager 114 may be performed by the content management system 106 and/or the client device 104. For example, the client-side application 110 may perform some or all of the functionality of the invitational content manager 114, and this disclosure anticipates all such embodiments.

An invitational content item is a content item associated with a marketer that is meant to inform a user about a specified topic, product or category. For example, invitational content items include videos, text, applications, images, audio, etc., that provide information about a specified topic, product or category that is being promoted by a marketer (e.g., an advertisement). That is, the marketer generally pays a monetary fee to have their invitational content items presented to users. This is in contrast to general content items that may be presented for entertainment or other purposes by a content provider. For example, a general content item may be an article, news report, instructional video, etc. Invitational content items are commonly presented along with or interlaced with general content items. For example, an invitational content item may be an advertisement presented along with general content items, such as articles in a digital magazine.

The invitational content manager 114 selects invitational content items to be presented to a user, and provides the selected invitational content items to the client device 104. The client device 104 presents the received invitational content items to the user on a display of the client device 104.

The invitational content items are stored in the data storage 112. To provide an invitational content item to a client device 104, the invitational content item manager 114 gathers the invitational content item from the data storage 112 and transmits the invitational content item to the client device 104 via the communication network 102.

An invitational content item is a content bundle including a variety of content types and instructions for arranging the included content. Examples of content types included in an invitational content item are images, video, text, interactive applications, audio, etc. The client-side application 110 utilizes the included instructions to properly present the invitational content item to a user. Presenting an invitational content item includes rendering images and text, playing audio and video, executing applications, etc. The client-side application 110 utilizes the provided instructions to properly arrange and present the invitational content item to the user.

The instructions further instruct the client-side application 110 on adjusting presentation of the invitational content item based on sensor data and other input received by the client device 104. For example, the instructions dictate adjustments to the presentation of the invitational content item based on detected movements of the client device 104, captured image data, user inputs, etc.

The invitational content manager 114 selects invitational content items to present to a user. For example, the invitational content manager 114 selects invitational content items to present to a user based on a user's taste profile, current context and a determined engagement value of the user.

A taste profile indicates a user's taste in various topics, activities, services, items, etc., and is based on multiple data sources such as the user's social networking activity (e.g., Pinterest, Facebook, Twitter, Instagram, etc.), demographic data, and data provided by the user. Invitational content manager 114 communicates with the third party data sources 108 to gather a user's social networking activity as well as demographic data. For example, the invitational content manager 114 utilizes user credential data provided by the user to access the user's social networking account to gather the social networking activity (e.g., recent likes, recent pins, recent check-ins, etc.).

The invitational content manager 114 also prompts the user to provide taste data such as the user's likes, dislikes, etc. For example, the invitational content manager 114 prompts the user with questions when the user is creating an account with the content management system 106 and/or by periodically querying the user. The user's taste profile is stored in data storage 112.

The current context of the user describes a current state of the user and/or a current state of the user's surrounding. The current context of the user is determined based on data such as the geographic location of the user, current weather data, a current time, a current day or a proximity of the user to specified retail locations, etc. The invitational content manager 114 gathers contextual data from the client device 104 as well as the third party data sources 108. For example, the invitational content manager 114 gathers sensor data captured by the client device 104, such as location, movement and image data. The invitational content manager 114 gathers data such as the current weather from the third party data sources 108 (e.g., a weather service).

The engagement value for a user indicates the user's level of engagement with content presented on the user's client device 104. A user's level of engagement indicates the level at which the user is actively viewing and participating with content presented on their client device 104. This may include an invitational content item (e.g., an advertisement), or general content (e.g., article). For example, a user that is viewing the relevant portion of a video, interacting with user interface elements, and/or is otherwise actively engaged with content is given a high engagement value. Alternatively, a user that is looking away from the screen, has the volume low, and/or is otherwise not actively engaged with the content presented by the client device 104 is given a low engagement value.

The engagement value for a user can be used to estimate a likelihood that the user will engage with an invitational content item presented on the client device 104. For example, a user with a high engagement value is estimated as being likely to engage with an invitational content item presented to the user. Alternatively, a user with a low engagement value is estimated as being unlikely to engage with an invitational content item presented to the user.

The invitational content manager 114 determines an engagement value for a user based on a variety of factors, such as a determined gaze of the user, an auditory assessment, an emotional assessment, the user's response to visual challenges, the user's response to offers, etc. The gaze of the user indicates coordinates at which the user is looking relative to a client device 104. The invitational content manager 114 determines the gaze of a user based on captured live images of the user's eyes. For example, the client device 104 captures images of the user using an optical sensor (e.g., camera) of the client device 104, and transmits the images to the content management system 106. The invitational content manager 114 uses the received images as input into a neural network that outputs the coordinates at which the user is looking.

The invitational content manager 114 uses the taste profile, the current context, and the engagement value of a user to select an invitational content item to present to the user. After the invitational content manager 114 selects an invitational content item for a user, the invitational content manager 114 transmits the invitational content item to the user's client device 104, where the invitational content item is presented to the user. For example, the client-side application 110 causes the client device 104 to present the invitational content item, including any video, text, applications, etc., included in the invitational content item, on a display of the client device 104.

The invitational content manager 114 uses a user's engagement value in a variety of others ways other than for just selecting an invitational content item for a user. For instance, the invitational content manager 114 may use the engagement value to determine whether or when to present the user with an invitational content item. For example, a marketer may prefer that invitational content items be delivered to a user while the user is actively engaged with content presented on their client device 104. As another example, a user's engagement value may also be used to vary invitational content items that are being presented to a user. For example, a user that is actively engaged with an invitational content item may be presented with an extended version of the invitational content item or additional features, content, offers associated with the invitational content item, etc. Alternatively, when a user is not actively engaged with an invitational content item, the invitational content item may be cut short or replaced with an alternate invitational content item.

In some embodiments, a marketer may wish to incentivize a user to view an invitational content item by offering the user a reward (e.g., monetary reward). In this type of situation, the invitational content manager 114 uses a user's engagement value to ensure that the user is adequately engaged with the invitational content item to warrant receiving the offered reward. For example, the user's engagement value is determined and monitored throughout presentation of the invitational content item and compared to a threshold engagement value. The user is assigned the reward if the user's engagement value meets or transgresses the threshold engagement value during presentation of the invitational content item. Alternatively, if the user's engagement value falls below the threshold engagement value, the user may be assigned only a portion or even none of the award.

The user's engagement value may further be used to select which award to offer the user in exchange for viewing an invitational content item. For example, a user with a high engagement value, either current or historical, may be offered a higher reward than a user that has a lower engagement value. This benefits both marketers and the users. For example, marketers benefit by providing users with a reward that is commensurate with the engagement the user is expected to provide, and users are properly rewarded for the level of engagement they provide.

The content management system 106 also includes a model generation module 116 that is configured to generate the neural network that determines the gaze of the user. The model generation module 116 generates the neural network using training images of users looking at various coordinates in relation to a client device 104. One technical issue with training a neural network is creating or acquiring adequate training data to properly train the model. For example, training a neural network to output coordinates based on an image of a user requires multiple training images of users looking at various known coordinates. To alleviate this technical issue, the model generation module 116 generates training data for the neural network. For example, the model generation module 116 utilizes a three-dimensional model of a user to generate images of a virtual user looking at various coordinates. This allows the model generation module 116 to generate a large amount of training data to train the neural network. The functionality of the model generation module 116 is described in greater detail below in relation to FIG. 6.

Figure 2:
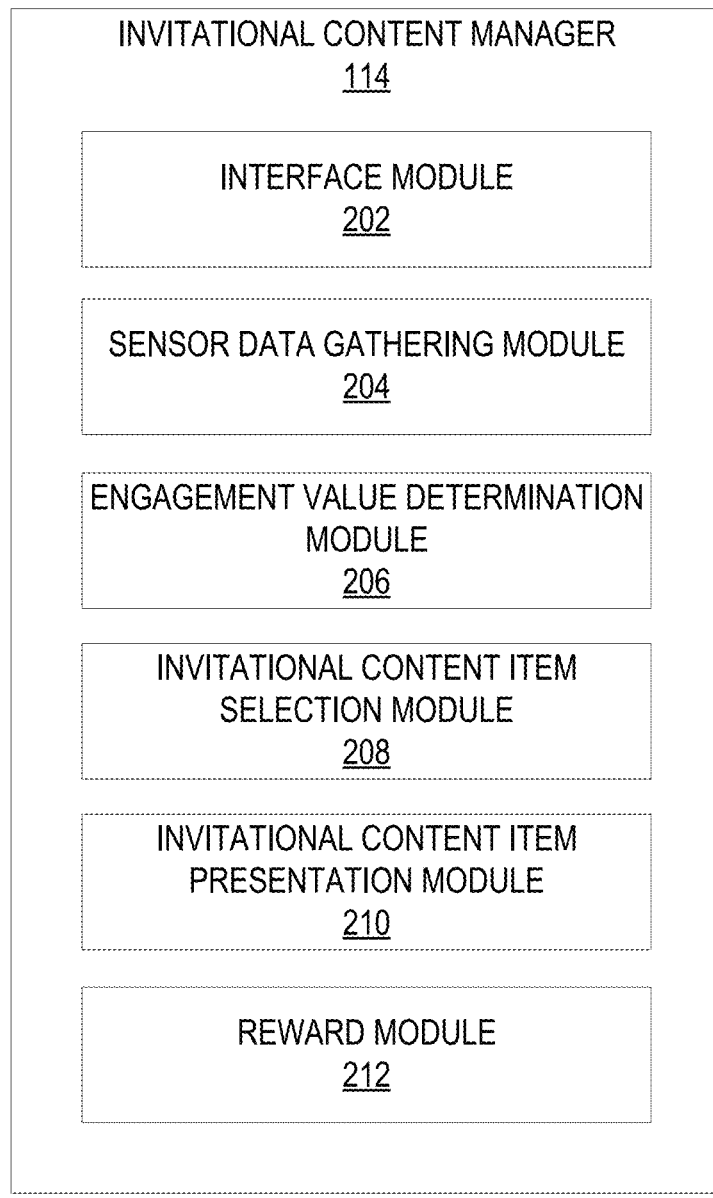
FIG. 2 is a block diagram of the invitational content item manager, according to some example embodiments.

FIG. 2 is a block diagram of the invitational content item manager 114, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the invitational content item manager 114 to facilitate additional functionality that is not specifically described herein. Furthermore, the various functional modules depicted in FIG. 2 may reside on a single computing device or may be distributed across several computing devices in various arrangements such as those used in cloud-based architectures. For example, the various functional modules of the invitational content manager 114 may be distributed across the content management system 106 and the client device 104 (e.g., the client-side application 110). Further, the content management system 106 may be comprised of multiple computing devices, and the various functional modules of the invitational content manager 114 may be distributed across any combination of these multiple computing devices.

As shown, the invitational content item manager 114 includes an interface module 202, a sensor data gathering module 204, an engagement value determination module 206, an invitational content item selection module 208, an invitational content item presentation module 210, and a reward module 212.

The interface module 202 provides a user with a content management interface that enables the user to adjust user settings, provide user preferences, tastes, etc. The content management interface further enables the user to view awards that have been awarded to the user, view invitational content items that are available to view, and select to view an available invitational content item. The interface module 202 provides the client device 104 with data that the client-side application 110 uses to present the content management interface on a display of the client device 104. The content management interface includes user interface elements (e.g., buttons, text fields, sliders, etc.) that enable a user to utilize the functionality of the content management interface.

The sensor data gathering module 204 captures sensor data from the sensors of the client device 104. Examples of sensors include front facing and rear facing cameras configured to capture image data, a microphone configured to capture audio data, an accelerometer and gyroscope configured to capture movement data, a compass and Global Positioning System (GPS) component configured to capture location and directional data, touch sensor to capture a user fingerprint, etc. The sensor data gathering module 204 provides the captured sensor data to the other modules of the invitational content manager 114.

The engagement value determination module 206 determines an engagement value for a user. An engagement value indicates a user's level of engagement with content presented on the user's client device 104. A user's level of engagement indicates the level at which the user is actively viewing and participating with content presented on their client device 104. This may include both an invitational content item (e.g., an advertisement), or general content items (e.g., an article). For example, a user that is viewing the relevant portion of a video, interacting with user interface elements, and/or is otherwise actively engaged with content is given a high engagement value. Alternatively, a user that is looking away from the screen, has the volume low, and/or is otherwise not actively engaged with the content presented by the client device 104 is given a low engagement value.

The engagement value determination module 206 determines an engagement value for a user based on a variety of factors, such as a determined gaze of the user, an auditory assessment, an emotional assessment, the user's response to visual challenges, the user's response to offers, etc. The gaze of the user indicates coordinates at which the user is looking relative to a client device 104. The engagement value determination module 206 determines the gaze of a user using images of the user's eyes as input into a neural network that outputs the coordinates at which the user is looking. The neural network is trained using images of users looking at various coordinates in relation to a client device 104. The functionality of the engagement value determination module 206 is described in greater detail below in relation to FIG. 3.

The invitational content item selection module 2088 selects invitational content items to present to a user based on multiple types of data including a user's taste profile, current context and a determined engagement value of the user. A taste profile indicates a user's taste in various topics, activities, services, items, etc., and is based on multiple data sources such as the user's social networking activity (e.g., Pinterest, Facebook, Twitter, Instagram, etc.), demographic data, and data provided by the user. The invitational content item selection module 208 communicates with the third party data sources 108 to gather a user's social networking activity as well as demographic data. For example, the invitational content item selection module 208 utilizes user credential data provided by the user to access the user's social networking account to gather the social networking activity (e.g., recent likes, recent pins, recent check-ins, etc.).

The invitational content item selection module 208 also prompts the user to provide taste data such as the user's likes, dislikes, etc. For example, the invitational content item selection module 208 prompts the user with questions when the user is creating an account with the content management system 106 and/or by periodically querying the user. The user's taste profile is stored in data storage 112.

The current context of the user describes a current state of the user and/or a current state of the user's surrounding. The current context of the user is determined based on data such as the geographic location of the user, current weather data, a current time, a current day or a proximity of the user to specified retail locations, etc. The invitational content item selection module 208 gathers contextual data from the client device 104 as well as the third party data sources 108. For example, the invitational content item selection module 208 uses the sensor data gathered by the sensor data gathering module 204 from the client device 104. The sensor data may include location, movement and image data. The invitational content item selection module 208 gathers data such as the current weather from the third party data sources 108 (e.g., a weather service).

The user's engagement value is used to determine the user's likes and/or dislikes in relation to content. For example, the invitational content item selection module 208 determines that a user likes content when the user's engagement value is high while the content is being presented. Alternatively, the invitational content item selection module 208 determines that a user does not like content when the user's engagement value is low while the content is being presented.

The invitational content item selection module 208 uses the user's taste profile to determine subjects, products, etc., that the user likes and/or dislikes. For example, the user's taste profile may indicate that the user likes the guitar, likes football, likes gardening, etc. Accordingly, the invitational content item selection module 208 uses the user's taste profile to select categories of invitational content items from which to choose. That is, the invitational content item selection module 208 selects invitational content items that are related to subjects, products, etc., that the user likes, and does not select invitational content items that are related to subjects, products, etc., that the user dislikes. The invitational content item selection module 208 uses the current context of the user to select types of invitational content items that are best suited for the user's current context. For example, in a context such as a loud location, an invitational content item that does not include sound or includes written subtitles may be selected. As another example, when a user has headphones connected to the client device 104, an invitational content item that does include sound is selected.

The engagement value of the user is used by the invitational content item selection module 208 to further refine selection of invitational content items. For example, the user's historical engagement values determined during previous presentation of invitational content items may be used to determine types of invitational content items that the user likes and/or dislikes. This may include the user's preferences based on the subject of the invitational content item (e.g., gardening, sports, etc.) as well as the media type of the invitational content item (e.g., audio, video, etc.). Further, the user's current engagement value may be used to select an invitational content item best suited for the user. For example, a user that isn't engaged may be presented with an audio based invitational content item that doesn't require the user to be viewing the display of their client device 104. Alternatively, a user that is actively engaged with their client device 104 may be presented with an invitational content item that includes interactive features, video, etc.

The invitational content item presentation module 210 manages presentation of the invitation content items selected by the invitational content item selection module 208. For example, the invitational content item presentation module 210 causes the selected invitational content item to be presented by the user's client device 104. Presentation of the invitational content item includes presenting the invitational content item on one or more of the outputs of the client device 104, such as the display, speakers, etc., of the client device 104.

In addition to causing presentation of an invitational content item, the invitational content item presentation module 210 further determines whether and/or when to present an invitational content item to a user. For example, a marketer may desire that their invitational content items be presented while a user is at a threshold level of engagement. In this type of situation, the invitational content item presentation module 210 compares the engagement value of a user to a threshold engagement value to determine whether to present the invitational content item to the user. For example, the invitational content item presentation module 210 presents the invitational content item to the user in response to the engagement value meeting or exceeding the threshold engagement value. Alternatively, the invitational content item presentation module 210 does not present the invitational content item if the engagement value is below the threshold engagement value.

The threshold engagement value may be a standard threshold value used for each invitational content item with an engagement requirement. Alternatively, the threshold engagement value may be variable based on the invitational content item. For example, a marketer may request varying levels of user engagement for specific invitational content. Accordingly, a marketer may request a higher level of user engagement as prerequisite to presenting an invitational content item that includes video and/or interactive features, and may request a lower level of user engagement for invitational content items that include only an image. Although an invitational content item may be associated with an engagement requirement (e.g., that the user meet a threshold level of engagement), this is not required of all invitational content items.

The invitational content item presentation module 210 may also cause modification of presentation of an invitational content. That is, the invitational content item presentation module 210 may modify presentation of an invitational content item based on an engagement value of a user. For example, a user that is actively engaged with an invitational content item may be presented with an extended version of the invitational content item, additional features, special offers, etc. Alternatively, a user that is not actively engaged with an invitational content item may be presented with a shortened version of the invitational content item, or presented with an alternate invitational content item. The invitational content item presentation module 210 monitors the engagement value of the user during presentation of the invitational content item to determine whether the user is actively engaged with the invitational content item. That is, the invitational content item presentation module 210 compares the engagement value of the user to threshold engagement values to determine an engagement zone that the user is within. For example, the engagement zones may indicate whether the user is low engagement, average engagement, or high engagement. The invitational content item presentation module 210 modifies presentation of the invitational content item based on the engagement zone of the user. For example, the invitational content item presentation module 210 causes an extended version of the invitational content item to be presented when the user is in the high engagement zone, an alternate invitation content item to be presented when the user is in the low engagement zone, and does not cause modification of the invitational content item when the user is in the average engagement zone.

The reward module 212 manages providing rewards to a user for viewing an invitational content item. In some embodiments, a marketer may offer a reward to a user as an incentive for the user to view the marketer's invitational content item. A reward may be any type of reward, such as a monetary reward, rebate, physical item, etc. The reward module 212 manages determining a reward to present to a user, determining whether the user has earned the reward, and allocating the reward to the user. The reward module 212 determines the reward to offer to a user based on a variety of factors. For example, the reward module 212 determines the reward based on the user's engagement value, both currently and historically. For example, the reward module 212 offers a higher reward to users that are actively engaged with content on their client device 104 and/or have a history of high levels of engagement with invitational content items.

The reward module 212 may also determine a reward value based on the user's demographic data and/or taste profile. For example, the reward module 212 may offer a higher reward to a user that meets a specified demographic category and/or likes a category, product, etc., offered by the invitational content item. Alternatively, the reward module 212 may offer a lower reward to a user that does not meet a specified demographic category and/or is not known to like a category, product, etc., offered by the invitational content item.

The reward module 212 causes the user to be presented with an offer to view the invitational content item in exchange for the reward. The user may choose to accept or deny the offer. If the user chooses to accept the reward, the invitational content item is presented to the user.

The reward module 212 ensures that a user that has accepted the offer performs their end of the bargain. That is, the reward module 212 ensures that the user views the invitational content item and maintains a threshold level of engagement during presentation of the invitational content item. This includes ensuring that both the user viewing the invitational content item is the targeted user (e.g., a different user isn't viewing the invitational content item), and that the user is maintaining the threshold level of engagement. The functionality of the reward module 212 is discussed in greater detail below in relation to FIG. 5.

Figure 3:
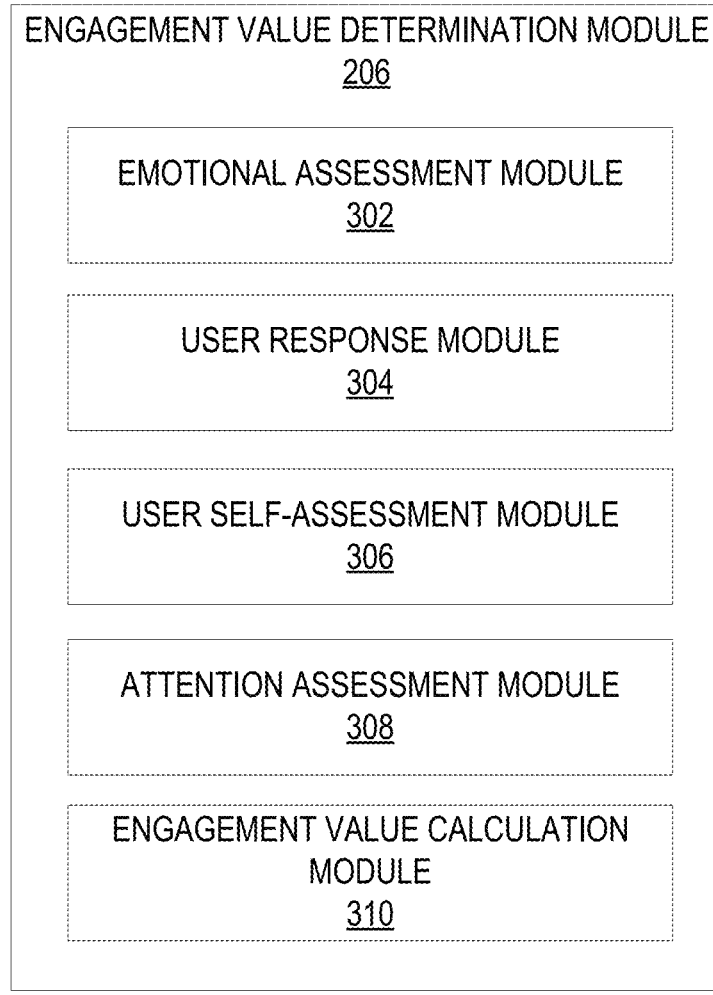
FIG. 3 is a block diagram of the engagement value determination module, according to some example embodiments.

FIG. 3 is a block diagram of the engagement value determination module 206, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the engagement value determination module 206 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the engagement value determination module 206 includes an emotional assessment module 302, a user response module 304, a user self-assessment module 306, an attention assessment module 308, and an engagement value calculation module 310.

The emotional assessment module 302 determines a current emotion of the user. The current emotion indicates the user's emotional response or feelings. For example, the current emotion of a user may indicate that the user is happy, sad, disinterested, excited, bored, etc. The emotional assessment module 302 may perform an emotional assessment of the user in a variety of ways. In some embodiments, the emotional assessment module 302 determines the current emotion of the user based on images of the user captured by an optical sensor of the client device 104. The emotional assessment module 302 analyzes the captured images to determine the current emotion of the user.

The emotional assessment module 302 may analyse the images in a variety of ways. In some embodiments, the emotional assessment module 302 analyses the images to identify features that indicate the current emotion of the user. For example, features such as a smile, frown, etc., may be indicative that the user is happy, sad, etc.

The emotional assessment module 302 may also use a set of training images to analyse images of the user. The set of training images include images of users in known emotional states. That is, the images include metadata indicating the emotional state of the user that is captured in the image. The emotional assessment module 302 compares an image of the user captured by the client device 104 to the set of training images to find similar training images. The emotional assessment module 302 uses the metadata associated with the similar training images to determine the current emotion of the user. For example, if the image of the user is determined to be similar to training images of users that are happy, the emotional assessment module 302 determines that the current emotion of the user is happy.

The emotional assessment module 302 determines similarity between images using any of a variety of techniques. For instance, the emotional assessment module 302 generates vectors that represent the images of the user and the training images. The emotional assessment module 302 then uses a distance function to identify vectors representing training images that are closest to the vector representing the image of the user. Vectors that are close to each other represent images that are similar to each other.

The user response module 304 determines a response level of a user to an invitational content item. A response level indicates whether the user responded to offers associated with an invitational content item. Offers may include offers to purchase an item, provide specified information, etc. The user response module 304 monitors the user's actions to determine whether the user has responded to any offers included in the invitational content item. The user response module 304 uses this information to determine the response level of the user. For instance, a user that has responded to many or all of the offers included in the invitational content item is determined to have a high response level. Alternatively, a user that has responded to a low number or none of the offers is determined to have a low response level.

The user self-assessment module 306 gathers information directly from the user indicating the user's level of engagement with an invitational content item. That is, the user response module 304 prompts the user to provide feedback regarding the invitational content item. This includes whether the user liked/disliked the invitational content item, the relevance of the invitational content item to the user, and/or the user's self-perceived level of engagement with the invitational content item.

The attention assessment module 308 determines a level at which the user is paying attention to the invitational content item. That is, the attention assessment module 308 determines the level at which the user is listening, watching, processing and/or interacting with an invitational content item. The functionality of the attention assessment module 308 is discussed in greater detail below in relation to FIG. 4.

The engagement value calculation module 310 calculates an engagement value for a user based on the output of the emotional assessment module 302, the user response module 304, the user self-assessment module 306 and the attention assessment module 308. The engagement value calculation module 310 may use any variety of algorithm or combination of the data to calculate the engagement value. Further, the engagement value calculation module 310 may apply varying weights to the different data when calculating the engagement value. The engagement value indicates a user's level of engagement with content presented on the user's client device 104.

Figure 4:
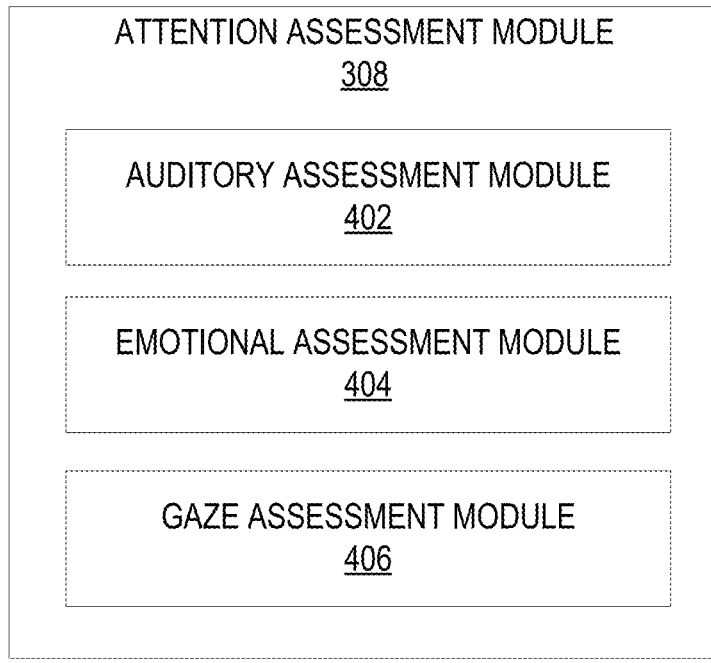
FIG. 4 is a block diagram of the attention assessment module, according to some example embodiments.

FIG. 4 is a block diagram of the attention assessment module 308, according to some example embodiments. To avoid obscuring the inventive subject matter with unnecessary detail, various functional components (e.g., modules) that are not germane to conveying an understanding of the inventive subject matter have been omitted from FIG. 4. However, a skilled artisan will readily recognize that various additional functional components may be supported by the attention assessment module 308 to facilitate additional functionality that is not specifically described herein. Furthermore, the various functional modules depicted in FIG. 4 may reside on a single computing device or may be distributed across several computing devices in various arrangements such as those used in cloud-based architectures.

As shown, the attention assessment module 308 includes an auditory assessment module 402, an emotional assessment module 404, and a gaze assessment module 406.

The auditory assessment module 402 determines whether a user is listening to audio included in an invitational content item. The auditory assessment module 402 may present auditory challenges to determine whether a user is listening. An auditory challenge may include an auditory prompt for a user to perform an action. For example, an auditory challenge may be prompting the user to nod their head. The auditory assessment module 402 determines whether the user has successfully performed the requested action.

The auditory assessment module 402 may also determine whether a user is using headphones and/or the volume of the client device 104 is set to an appropriate volume for the user to properly listen to audio included in the invitational content item. In some embodiments, the auditory assessment module 402 uses sensor data gathered from microphones of the client device 104 to determine an appropriate volume for the user to properly listen to audio included in the invitational content item. For example, if the user is in a loud environment, the auditory assessment module 402 may determine that the volume should be louder than if the user is in a quieter environment.

The emotional assessment module 404 assesses the user's emotional response specific to the presented invitational content item. That is, the emotional assessment module 404 determines whether the user's emotional response is appropriate given the content of the invitational content item at various points for the invitational content item. For example, the emotional assessment module 404 may determine whether the user is laughing during a funny portion of the invitational content item, which suggests that the user is paying attention to the content. As another example, the emotional assessment module 404 may determine whether the user is sad during a sad portion of the invitational content item.

The gaze assessment module 406 assesses whether the user is properly viewing the invitational content. One way in which the gaze assessment module 406 performs this is by determining a gaze of the user. The gaze of the user indicates coordinates at which the user is looking relative to a client device 104. The gaze assessment module 406 determines the gaze of a user based on captured live images of the user's eyes. For example, the client device 104 captures images of the user using an optical sensor (e.g., camera) of the client device 104, and transmits the images to the content management system 106. The gaze assessment module 406 uses the received images as input into a neural network that outputs the coordinates at which the user is looking.

In some embodiments, the neural network uses a convolutional neural network to analyze the image of the user and identify patches of relevant pixels. For example, the neural network identifies 2 patches of relevant pixels that include data that should be focused on during the following analysis. The neural network stacks the patches with the input image along a depth dimension to prevent loss of information. This allows for finer grained detail and thus a better resulting gaze determination.

The neural network uses a Variational Auto Encoder (VAE) network to yield latent variables that describe the input image at a high-level, such as the size of the face in the picture, the closeness of the eyes, the position/orientation of the pupil of the eye relative to the contours of the eyes, the orientation of the head, etc. The latent variables are fed to a HELEN-trained facial landmark extractor network that outputs the position of the facial landmarks in the input image. This data is then fed into a Neural Turning Machine (NTM), along with previous gaze position predictions, to yield the gaze for the user.

The gaze assessment module 406 uses the user's determined gaze to determine whether the user is looking at relevant portions of the invitational content item or, alternatively, not looking at relevant portions of the invitational content item. For example, the gaze assessment module 406 determines the user's viewing pattern (e.g., points at which the user has looked over time) and compares the user's viewing pattern to a desired viewing pattern based on the invitational content item. As another example, the gaze assessment module 406 determines whether the user's viewing pattern matches the viewing patterns of other users known to have been giving attention, benign inattention and/or deliberate inattention. The gaze assessment module 406 uses the comparison to determine whether the user is viewing the invitational content item as desired, or alternatively, being inattentive.

The gaze assessment module 406 may also present visual challenges to determine whether the user is actively viewing the invitational content item. A visual challenge is a visual prompt that requests a user to perform a specified action. For example, the visual challenge may include presenting a visual prompt requesting the user to tap a specified portion of the display, or to select a specified physical button of the client device 104.

The gaze assessment module 406 may also monitor the user's emotional reaction during user interface changes. For example, a user that shows no change in reaction to a user interface change, such as a change in the image, end of the invitational content item, etc., may be determined to not be actively watching the invitational content item. Alternatively, a user that does react to a change to the user interface may be determined to be actively watching the invitational content item.

Figure 5:
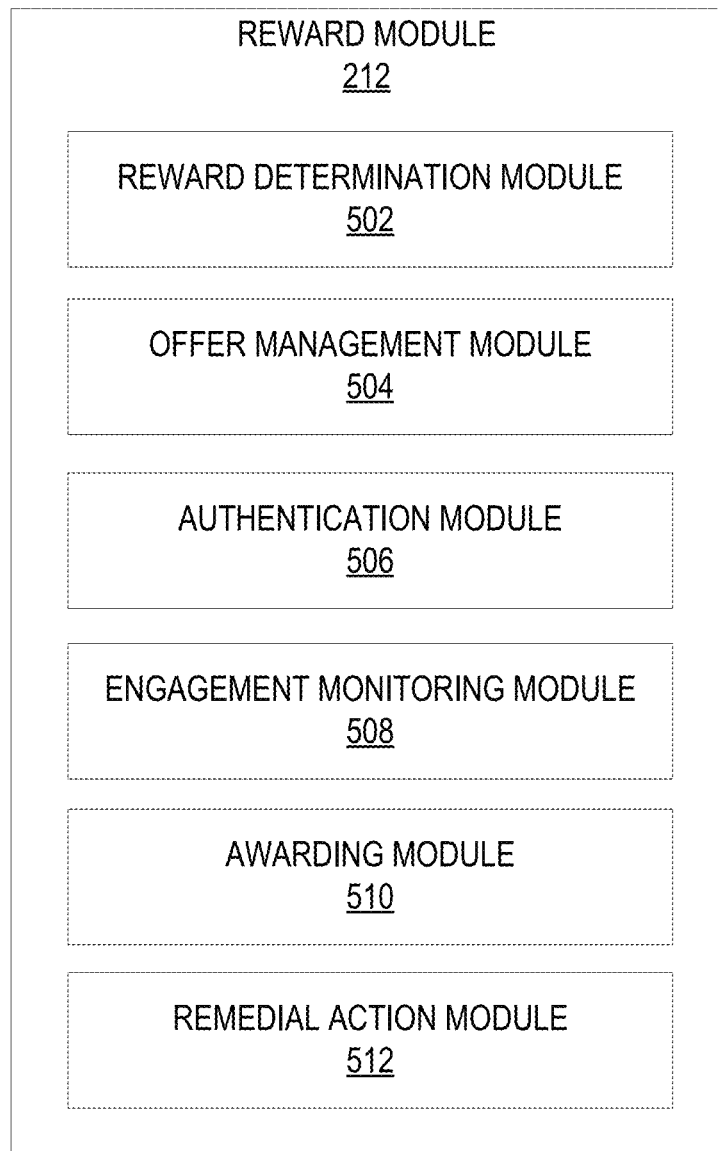
FIG. 5 is a block diagram of the reward module, according to some example embodiments.

FIG. 5 is a block diagram of the reward module 212, according to some example embodiments. To avoid obscuring the inventive subject matter with unnecessary detail, various functional components (e.g., modules) that are not germane to conveying an understanding of the inventive subject matter have been omitted from FIG. 5. However, a skilled artisan will readily recognize that various additional functional components may be supported by the reward module 212 to facilitate additional functionality that is not specifically described herein. Furthermore, the various functional modules depicted in FIG. 5 may reside on a single computing device or may be distributed across several computing devices in various arrangements such as those used in cloud-based architectures.

As shown, the reward module 212 includes a reward determination module 502, an offer management module 504, an authentication module 506, an engagement monitoring module 508, an awarding module 510, and a remedial action module 512

The reward determination module 502 determines a reward to offer to a user. A reward may be any type of reward, such as a monetary reward, rebate, physical item, etc. The reward determination module 502 determines the reward to offer to a user based on a variety of factors. For example, the reward determination module 502 determines the reward based on the user's engagement value, both current and historically. For example, the reward determination module 502 may offer a higher reward to users that are actively engaged with content on their client device 104 and/or have a history of high levels of engagement with invitational content items. Alternatively, the reward determination module 502 may offer a higher reward to a user that is not actively engaged to provide the user with a greater incentive to engage with the invitational content item. Likewise, the reward determination module 502 may offer a lower reward for a user that is actively engaged based on an assumption that the user does not require additional incentive to view the invitational content item.

The reward determination module 502 may also determine a reward value based on the user's demographic data and/or taste profile. For example, the reward determination module 502 may offer a higher reward to a user that meets a specified demographic category and/or likes a category, product, etc., offered by the invitational content item. Alternatively, the reward determination module 502 may offer a lower reward to a user that does not meet a specified demographic category and/or is not known to like a category, product, etc., offered by the invitational content item.

The offer management module 504 causes the user to be presented with an offer to view the invitational content item in exchange for the reward. For example, the offer management module 504 causes a message to be presented on the display of the client device 104 that notifies the user of the offer, including the reward that the user will be awarded for viewing the invitational content item. The message is presented with user interface elements (e.g., buttons) that allow the user to select to accept or deny the presented offer. The user uses the user interface element to select whether to accept or deny the offer. If the user chooses to accept the offer, the invitational content item is presented to the user.

The authentication module 506 utilizes security measures to ensure that the user viewing the invitational content item is the intended user. To do so, the authentication module 506 utilizes an image and fingerprint of the user captured by sensor data gathering module 204. The authentication module 506 compares the captured image and the fingerprint to a stored image and fingerprint of the known user of the client device 104 to ensure that the user using the client device 104 is the known user of the client device 104 (i.e., the intended recipient of the invitational content item). If the authentication module 506 determines that the user using the client device 104 is not the intended user, the authentication module 506 causes a remedial action be executed, such as pausing, suspending or terminating performance of the invitational content item by the client device 104, and/or causing the user to not be awarded the reward for viewing the invitational content item.

The authentication module 506 may use other techniques as well. For example, the authentication module 506 may also use the user's face, voiceprint, or retinal scan, to authenticate the user, or require the user to enter a code, etc.

The engagement monitoring module 508 monitors the engagement value of a user to determine whether the user has remained adequately engaged with the invitational content item to be awarded the reward. During presentation of the invitational content item, the engagement monitoring module 508 periodically compares a current engagement value of the user to a threshold engagement value. If the current engagement values of the user remain at or above the threshold value, the user is awarded the reward. Alternatively, if the current engagement values fall below the threshold value, a remedial action may be enacted.

The awarding module 510 assigns an award to the user. The reward may include any type of reward, such as monetary award, credit, physical item, etc. The awarding module 510 may communicate with a financial institution of the user to cause a monetary award to be transferred to the user's account. As another example, the awarding module 510 may cause an electronic coupon, voucher, etc., to be transferred to the user. For example, the awarding module 510 may cause the electronic voucher to be transferred to the user's client device 104.

The remedial action module 512 executes a remedial action in the event that a user's engagement value falls below the threshold value. A remedial action may include terminating presentation of the invitational content item, pausing presentation of the invitational content item, notifying the user to increase engagement, etc.

Figure 6:
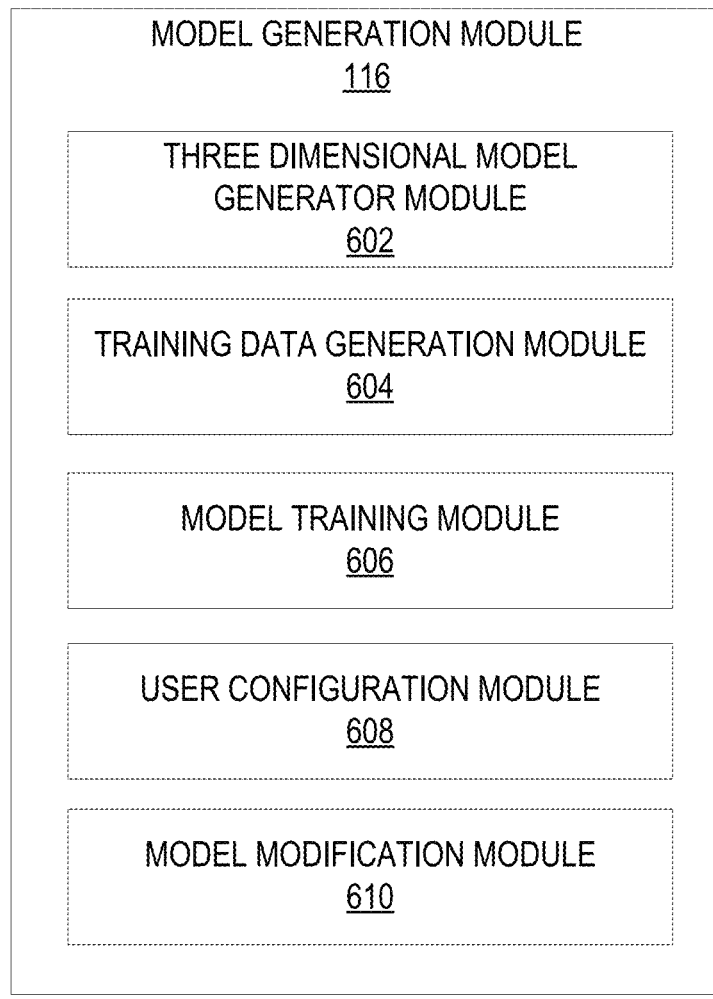
FIG. 6 is a block diagram of the model generation module, according to some example embodiments.

FIG. 6 is a block diagram of the model generation module 116, according to some example embodiments. To avoid obscuring the inventive subject matter with unnecessary detail, various functional components (e.g., modules) that are not germane to conveying an understanding of the inventive subject matter have been omitted from FIG. 6. However, a skilled artisan will readily recognize that various additional functional components may be supported by the model generation module 116 to facilitate additional functionality that is not specifically described herein. Furthermore, the various functional modules depicted in FIG. 6 may reside on a single computing device or may be distributed across several computing devices in various arrangements such as those used in cloud-based architectures.

As shown, the model generation module 116 includes a three-dimensional model generator module 602, a training data generation module 604, a model training module 606, a user configuration module 608, and a model modification module 610.

The model generation module 602 generates a virtual three-dimensional model of a human user. That is, the model generation module 602 uses data describing a human user to create a virtual version of the user that can be presented on a display of a computing device. The virtual model may depict an entire human user, or just a portion of the human user, such as the human user's head, head and body, etc. The model generation module 602 may include data to generate a virtual model of multiple human users. The generated virtual human user can be manipulated to be viewed at various angles, poses, etc. For example, the generated virtual human user's eyes and face can be manipulated to cause the virtual human user to view varying select coordinates. Additionally, features of the virtual human user may be modified. For example, the shape of the face, location of features, height, hair, eye colour, etc., can be manipulated to create a variety of different looking virtual human users.

The training data generation module 604 uses the generated model of the human user to generate training data for a neural network that determines the gaze of a user based on an image of the user's eyes. To generate the neural network, training data consisting of images of users looking at various locations is needed to train the neural network. Gathering this type of training data may be time consuming and cumbersome. Accordingly, the training data generation module 604 uses the generated model of the human user to generate training data for a neural network. That is, the training data generation module 604 generates images of the virtual human user looking at various coordinates. Each generated image includes metadata indicating a coordinate value that the virtual human user is looking at in the image. The training data generation module 604 modifies the features, pose, and/or orientation of the virtual human user to generate varied training data.

While the example of a three-dimensional model of a human user is used, this is just one example, and not meant to be limiting. Training data may also be generated using other models, such as a generative adversarial network (GAN).

The model training module 606 trains the neural network using the training data generated by the training data generation module 604. The training data includes images of a virtual user looking at various coordinates. Each image includes metadata describing the coordinates at which the virtual user in the image is looking. The resulting neural network outputs estimated coordinates at which a user is looking based on an input image of a user's eyes.

The user configuration module 608 gathers user data used to configure the neural network to a specified user. While the training data generated by the training data generation module 604 is used to train the neural network, it results in a general model rather than a model that is configured for a specified user. That is, the training data used to train the neural network does not include images of the specific user. The user configuration module 608 gathers images of the user looking at known coordinates, which is used to configure the neural network to the specified user. The user configuration module 608 causes visual indicators to be presented on the display of the client device 104, and prompts the user to look at the visual indicators. The user configuration module 608 captures images of the user looking at the various presented visual indicators. Each visual indicator is presented at a known coordinate, which results in image data of the specific user looking at known coordinates.

The model modification module 610 modifies the model based on the image data generated by the user configuration module 608. That is, the model modification module 610 generates a personalized version of the neural network for the specified user that is configured based on the images of the specified user. The model modification module 610 uses an image of the user captured by the user configuration module 608 as input in the neural network and then compares the resulting output of the neural network to the known coordinates at which the user was looking in the image. The model modification module 610 may then configure the neural network to adjust the output of the neural network for the user based on any determined variance between the output of the neural network and the known coordinates at which the user was looking in the image.

FIG. 7 is a flowchart showing a method for recommending an invitational content item, according to some example embodiments. The method 700 may be embodied in computer readable instructions for execution by one or more processors such that the operations of the method 700 may be performed in part or in whole by the invitational content manager 114; accordingly, the method 700 is described below by way of example with reference thereto. However, it shall be appreciated that at least some of the operations of the method 700 may be deployed on various other hardware configurations and the method 700 is not intended to be limited to the invitational content manager 114.

At operation 702, the invitational content manager 114 receives a content request from a client device 104. The client device 104 is associated with a first user profile.

At operation 704, the invitational content item selection module 208 gathers, from the user profile, data describing a taste profile of a user associated with the first user profile. The taste profile is based on web content that the user has pinned to a social networking account of the user, a demographic group of the user, and taste data provided by the user.

At operation 706, the invitational content item selection module 208 determines, based on contextual data gathered by the client device 104, a current context of the user. The current context of the user is based on at least one of a geographic location of the user, current weather data, a current time, a current day or a proximity of the user to specified retail location.

At operation 708, the engagement value determination module 206 determines, based on sensor data gathered from the client device 104, an engagement value indicating an estimated level at which the user will engage with an invitational content item presented on the client device 104. The engagement value of the user is based on motion data describing motion of the client device 104 and a detected gaze (e.g., eye movements) of the user. The gaze of the user is determined from image data captured by a camera of the client device 104.

At operation 710, the invitational content item selection module 208 selects an invitational content item based on the taste profile, the current context of the user, and the engagement value of the user.

At operation 712, the invitational content item presentation module 210 causes the invitational content item to be presented on the client device 104.

FIG. 8 is a flowchart showing a method for adjusting presentation of an invitational content item based on sensor data, according to some example embodiments. The method 800 may be embodied in computer readable instructions for execution by one or more processors such that the operations of the method 800 may be performed in part or in whole by the invitational content item presentation module 210; accordingly, the method 800 is described below by way of example with reference thereto. However, it shall be appreciated that at least some of the operations of the method 800 may be deployed on various other hardware configurations and the method 800 is not intended to be limited to the invitational content item presentation module 210.

At operation 802, the invitational content item presentation module 210 analyses image data captured by the client device 104 while an invitational content item is being presented by the client device 104, yielding an analysis. The image data is captured by a front facing and/or rear facing camera of the client device 104. The image data depicts a user of the client device 104 while the invitation content item is being presented. The invitational content item presentation module 210 analyzes the image data by comparing the image data to a set of known images depicting user emotional reactions, yielding a comparison. Each known image is tagged with an emotion identifier describing an emotional reaction depicted by the known image. The invitational content item presentation module 210 then identifies, based on the comparison, a subset of known images that are similar to the image data.

At operation 804, the invitational content item presentation module 210 determines, based on the image data, an emotional reaction of the user to the invitational content item. The invitational content item presentation module 210 determines the emotional reaction of the user based on an emotional identifier tagged to at least a first known image from the subset of known images.

At operation 806, the invitational content item presentation module 210 adjusts presentation of the invitational content item based on the emotional reaction of the user. For example, when the emotional reaction of the user indicates that the user is having a negative reaction to the invitational content item, the invitational content item presentation module 210 adjusts presentation of the invitational content item by shortening a length of the invitational content item, terminating presentation of the invitational content item and/or presenting an alternate invitational content item.

As another example, when the emotional reaction of the user indicates that the user is having a positive reaction to the invitational content item, the invitational content item presentation module 210 adjusts presentation of the invitational content item by lengthening a presentation time of the invitational content item. Lengthening the presentation time of the invitational content item comprises presenting secondary content associated with the invitational content item.

The invitational content item presentation module 210 also determines, based on the image data, an environment surrounding the user, and adjusts presentation of the invitational content item based on the environment of the user. For example, the invitational content item presentation module 210 adjusts colors of the invitational content item based on colors in the environment of the user.

Figure 9:
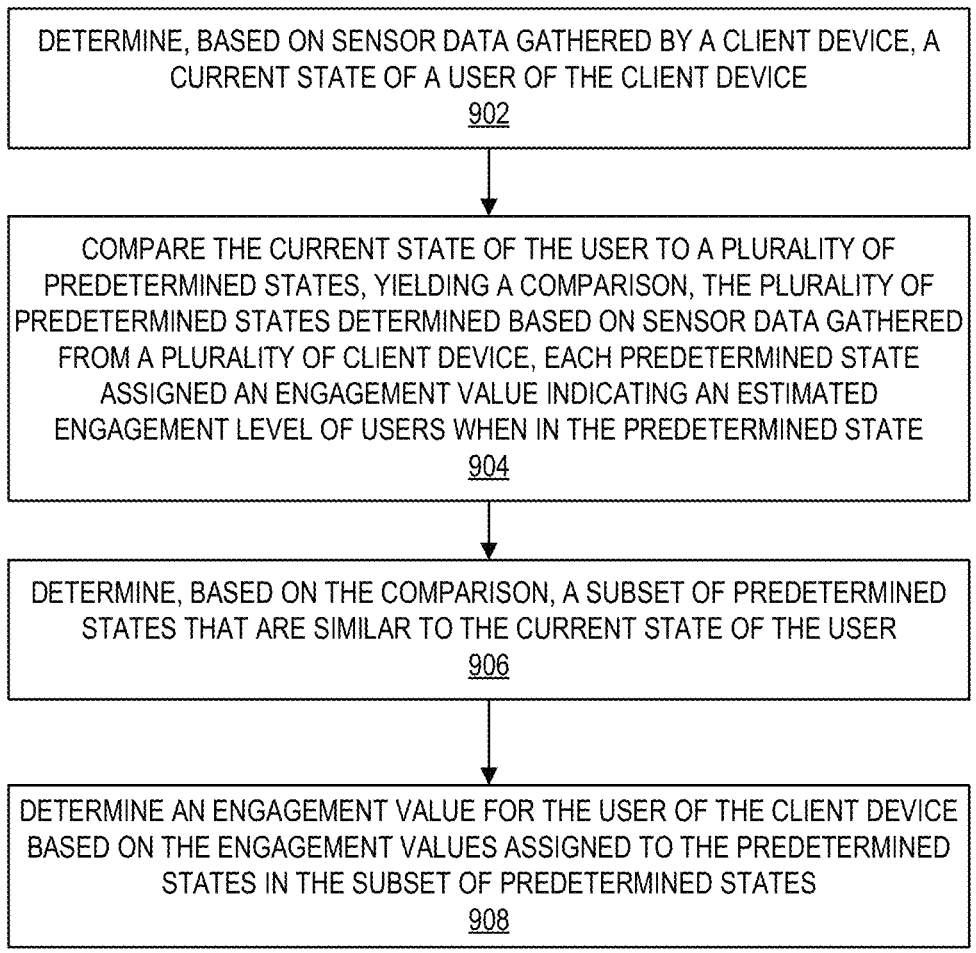
FIG. 9 is a flowchart showing a method for determining an engagement value of a user, according to some example embodiments.

FIG. 9 is a flowchart showing a method for determining an engagement value of a user, according to some example embodiments. The method 900 may be embodied in computer readable instructions for execution by one or more processors such that the operations of the method 900 may be performed in part or in whole by the engagement value determination module 206; accordingly, the method 900 is described below by way of example with reference thereto. However, it shall be appreciated that at least some of the operations of the method 900 may be deployed on various other hardware configurations and the method 900 is not intended to be limited to the engagement value determination module 206.

At operation 902, the emotional assessment module 302 determines, based on sensor data gathered by the client device 104, a current state of a user of the client device 104. The sensor data includes image data gathered using at least one of a front camera or rear camera of the client device 104 and movement data indicating a position and/or movement of the client device 104. The image data depicts the user of the client device 104.

The emotional assessment module 302 determines the current state of the user by determining a current emotion of the user based on the image data. The emotional assessment module 302 determines the current emotion of the user by comparing the image data to a set of known images depicting user emotions, yielding a comparison. Each known image is tagged with an emotion identifier describing a user emotion depicted by the known image. The emotional assessment module 302 identifies, based on the comparison, a subset of known images that are similar to the image data. The emotional assessment module 302 further determines the current state of the user by determining, based on the movement data, whether the user is moving or stationary, whether the user is sitting or standing, etc.

At operation 904, the emotional assessment module 302 compares the current state of the user to a plurality of predetermined states, yielding a comparison. The plurality of predetermined states are determined based on sensor data gathered from a plurality of client devices. Each predetermined state is assigned an engagement value indicating an estimated engagement level of users when in the predetermined state.

At operation 906, the emotional assessment module 302 determines, based on the comparison, a subset of predetermined states that are similar to the current state of the user.

At operation 908, the engagement value calculation module 310 determines an engagement value for the user of the client device 104 based on the engagement values assigned to the predetermined states in the subset of predetermined states.

To determine the predetermined states, the emotional assessment module 302 receives sensor data from the plurality of client devices 104, and determines the plurality of predetermined stated based on the sensor data received from the plurality of client devices 104. For each predetermined state, the engagement value calculation module 310 calculates an engagement value based on desired user actions performed by users while in the predetermined state. The desired actions include purchasing an item, entering contact information, interacting with an invitational content item for at least a threshold period of time, requesting secondary content associated with an invitational content item, etc.

Figure 10:
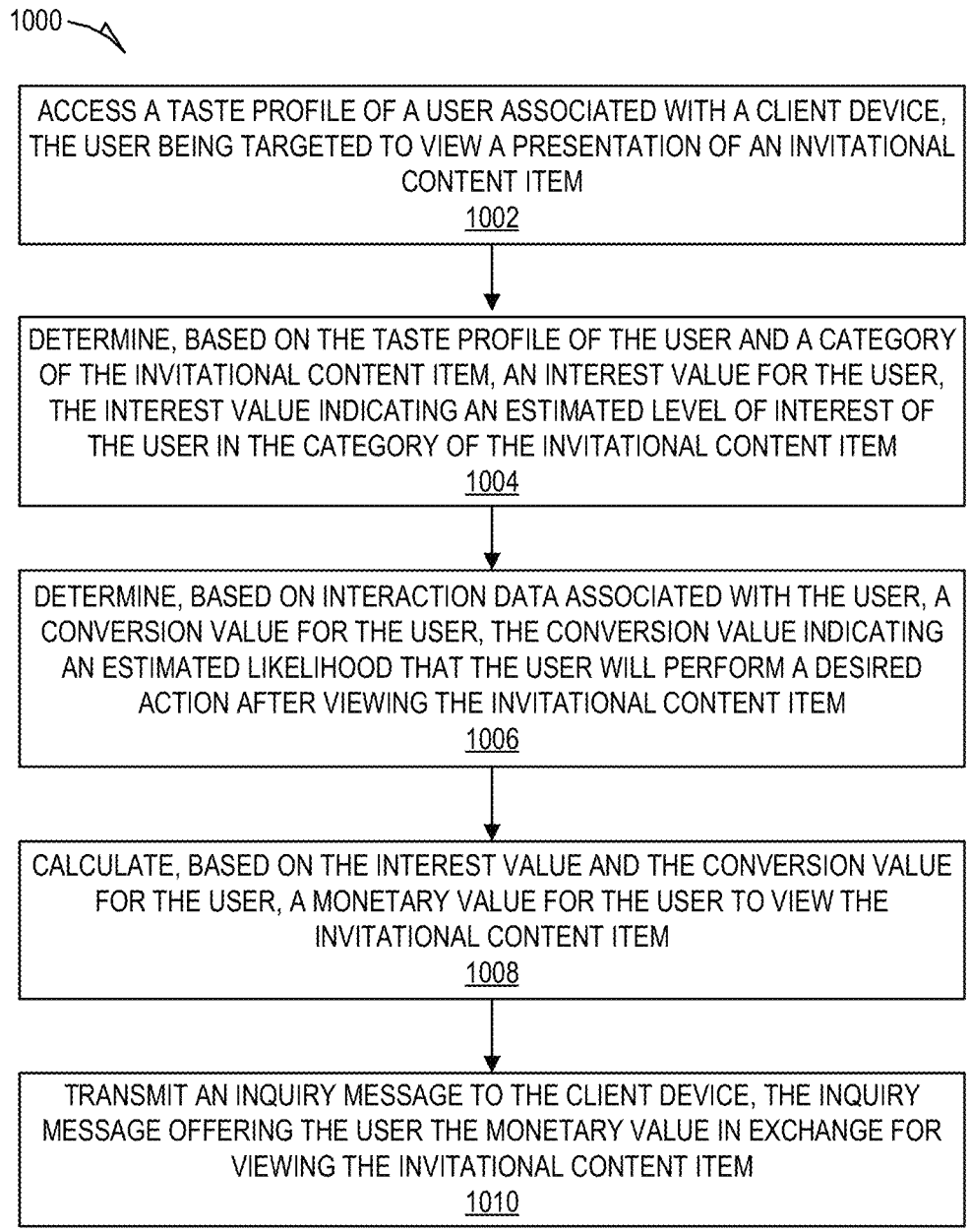
FIG. 10 is a flowchart showing a method for calculating a monetary value to offer a user to view an invitational content item, according to some example embodiments.

FIG. 10 is a flowchart showing a method for calculating a monetary value to offer a user to view an invitational content item, according to some example embodiments. The method 1000 may be embodied in computer readable instructions for execution by one or more processors such that the operations of the method 1000 may be performed in part or in whole by the reward module 212; accordingly, the method 1000 is described below by way of example with reference thereto. However, it shall be appreciated that at least some of the operations of the method 1000 may be deployed on various other hardware configurations and the method 1000 is not intended to be limited to the engagement value calculation module 310.

At operation 1002, the reward module 212 accesses a taste profile of a user associated with a client device 104, the user being targeted to view a presentation of an invitational content item. The taste profile is determined based on web content that the user has pinned to a social networking account of the user, a demographic group of the user, and on taste data provided by the user.

At operation 1004, the reward module 212 determines, based on the taste profile of the user and a category of the invitational content item, an interest value for the user. The interest value indicates an estimated level of interest of the user in the category of the invitational content item.

At operation 1006, the reward determination module 502 determines, based on interaction data associated with the user, a conversion value for the user. The conversion value indicates an estimated likelihood that the user will perform a desired action after viewing the invitational content item. The interaction data identifies a purchase history of the user after viewing invitational content items and the user's browsing history in relation to the category of the invitational content item.

At operation 1008, the reward determination module 502 calculates, based on the interest value and the conversion value for the user, a monetary value for the user to view the invitational content item.

At operation 1010, the offer management module 504 transmits an inquiry message to the client device 104. The inquiry message offers the user the monetary value in exchange for viewing the invitational content item.

If an affirmative response message to the inquiry message is received from the client device 104, the reward module 212 transmits the invitational content item to the client device 104. In response to determining that the user successfully viewed the invitational content item, the awarding module 510 credits the monetary value to an account associated with the user.

Figure 11:
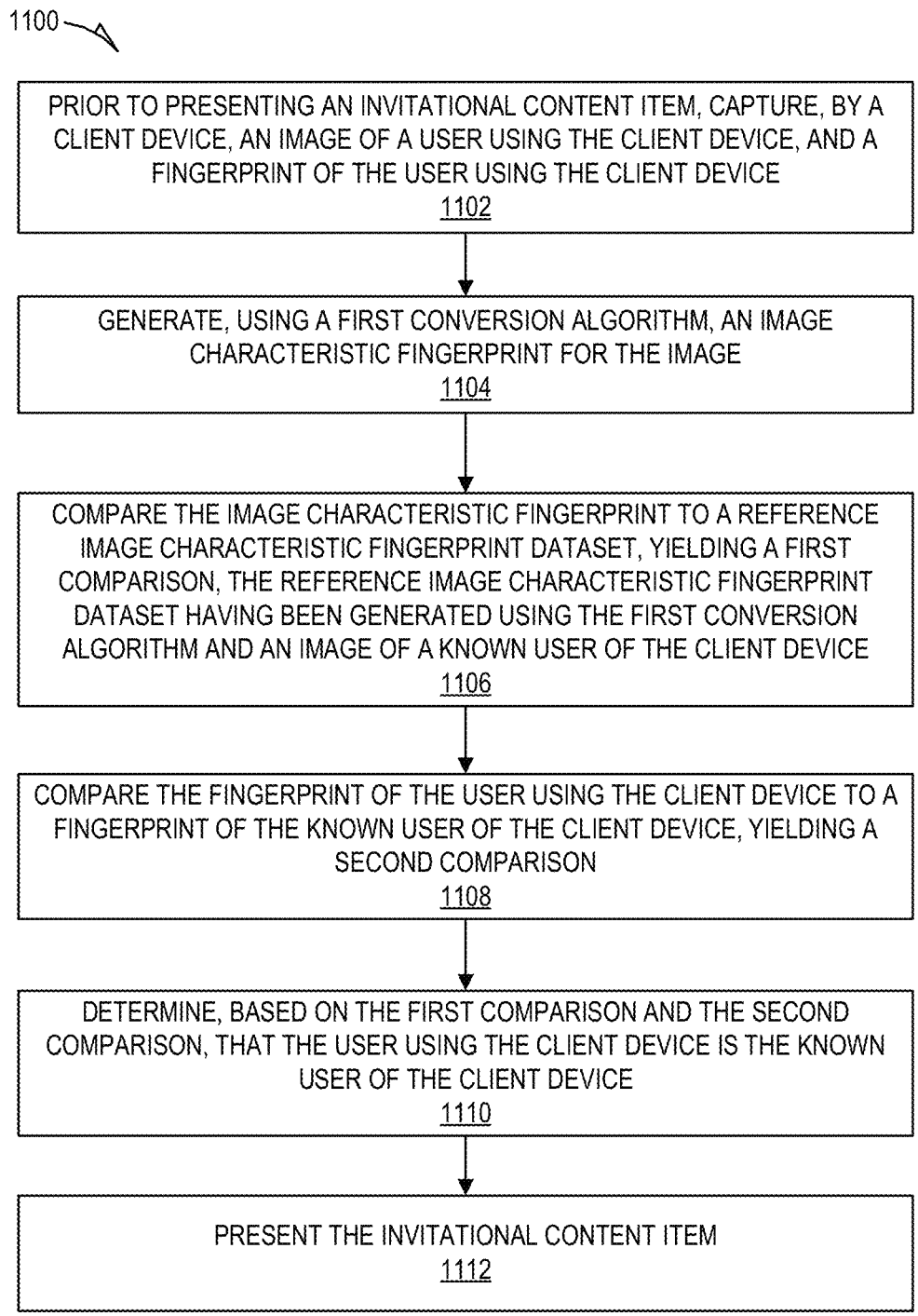
FIG. 11 is a flowchart showing a method for authenticating a user viewing an invitational content item, according to some example embodiments.

FIG. 11 is a flowchart showing a method for authenticating a user viewing an invitational content item, according to some example embodiments. The method 1100 may be embodied in computer readable instructions for execution by one or more processors such that the operations of the method 1100 may be performed in part or in whole by the invitational content manager 114; accordingly, the method 1100 is described below by way of example with reference thereto. However, it shall be appreciated that at least some of the operations of the method 1100 may be deployed on various other hardware configurations and the method 1100 is not intended to be limited to the invitational content manager 114.

At operation 1102, the sensor data gathering module 204 captures an image of a user using the client device 104, and a fingerprint of the user using the client device 104. This is performed prior to presenting an invitational content item.

At operation 1104, the authentication module 506 generates, using a first conversion algorithm, an image characteristic fingerprint for the image.

At operation 1106, the authentication module 506 compares the image characteristic fingerprint to a reference image characteristic fingerprint dataset, yielding a first comparison. The reference image characteristic fingerprint dataset having been generated using the first conversion algorithm and an image of a known user of the client device 104.

At operation 1108, the authentication module 506 compares the fingerprint of the user using the client device 104 to a fingerprint of the known user of the client device 104, yielding a second comparison.

At operation 1110, the authentication module 506 determines, based on the first comparison and the second comparison, that the user using the client device 104 is the known user of the client device 104.

The authentication module 506 may use other techniques as well. For example, the authentication module 506 may also use the user's face, voiceprint, or retinal scan to authenticate the user, or require the user to enter a code, etc.

At operation 1112, the invitational content item presentation module 210 presents the invitational content item.

The engagement monitoring module 508 further monitors a gaze of the user using the client device 104, while the invitational content item is being presented. The engagement monitoring module 508 determines, based on the gaze of the user, whether the user using the client device 104 is engaged with the invitational content item. The engagement monitoring module 508 determines whether the user using the client device 104 is engaged with the invitational content item by determining, based on the eye gaze of the user, whether the user is looking at the invitational content item or the user is not looking at the invitational content item.

If the engagement monitoring module 508 determines that the user using the client device 104 is not engaged with the invitational content item, the remedial action module 512 executes a remedial action. A remedial action includes pausing presentation of the invitational content item, presenting an alert message instructing the user to begin engaging with the invitational content item, etc.

Figure 12:
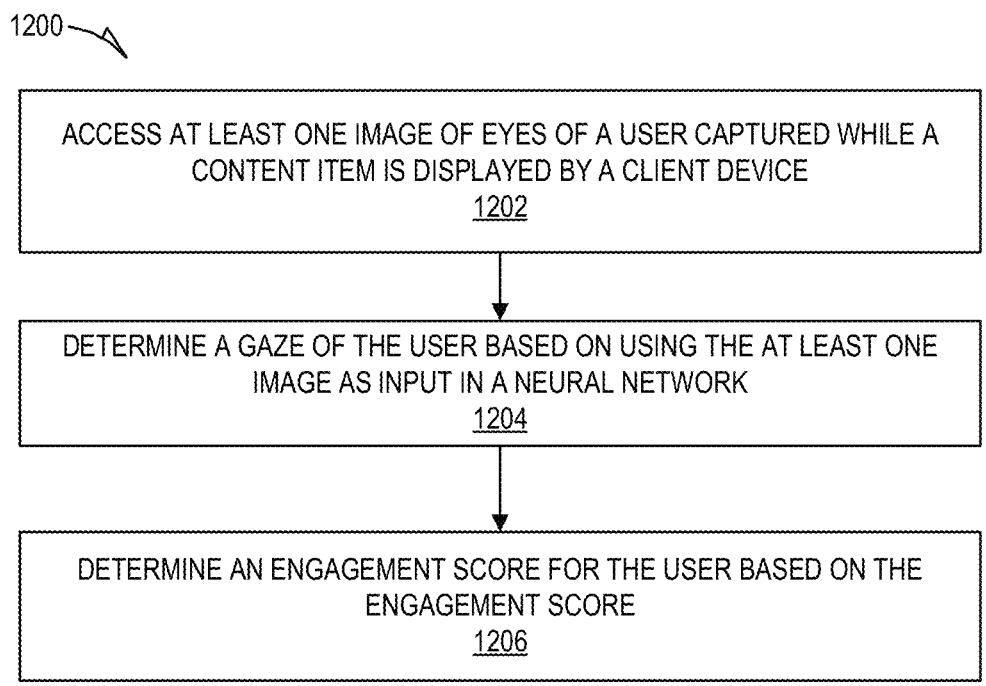
FIG. 12 is a flowchart showing a method for generating an engagement score for a user, according to some example embodiments.

FIG. 12 is a flowchart showing a method for generating an engagement score for a user, according to some example embodiments. The method 1200 may be embodied in computer readable instructions for execution by one or more processors such that the operations of the method 1200 may be performed in part or in whole by the invitational content manager 114; accordingly, the method 1200 is described below by way of example with reference thereto. However, it shall be appreciated that at least some of the operations of the method 1200 may be deployed on various other hardware configurations and the method 1200 is not intended to be limited the invitational content manager 114.

At operation 1202, the sensor data gathering module 204 accesses at least one image of eyes of a user that is captured while a content item is displayed by a client device. The sensor data gathering module 204 captures sensor data from the sensors of the client device 104. Examples of sensors include a front facing and rear facing camera configured to capture image data, a microphone configured to capture audio data, accelerometer and gyroscope configured to capture movement data, a compass and Global Positioning System (GPS) component configured to capture location and directional data, a touch sensor to capture a user fingerprint, etc.

At operation 1204, the gaze assessment module 406 determines a gaze of the user based on using the at least one image as input in a neural network. The gaze of the user indicates coordinates at which the user is looking relative to a client device 104. The gaze assessment module 406 determines the gaze of a user based on captured live images of the user's eyes. For example, the client device 104 captures images of the user using an optical sensor (e.g., camera) of the client device 104, and transmits the images to the content management system 106. The gaze assessment module 406 uses the received images as input into a neural network that outputs the coordinates at which the user is looking.

At operation 1206, the engagement value calculation module 310 determines an engagement score for the user based on the engagement score. The engagement value calculation module 310 may use any variety of algorithm or combination of the data to calculate the engagement value. Further, the engagement value calculation module 310 may apply varying weights to the different data when calculating the engagement value. The engagement value indicates a user's level of engagement with content presented on the user's client device 104.

Figure 13:
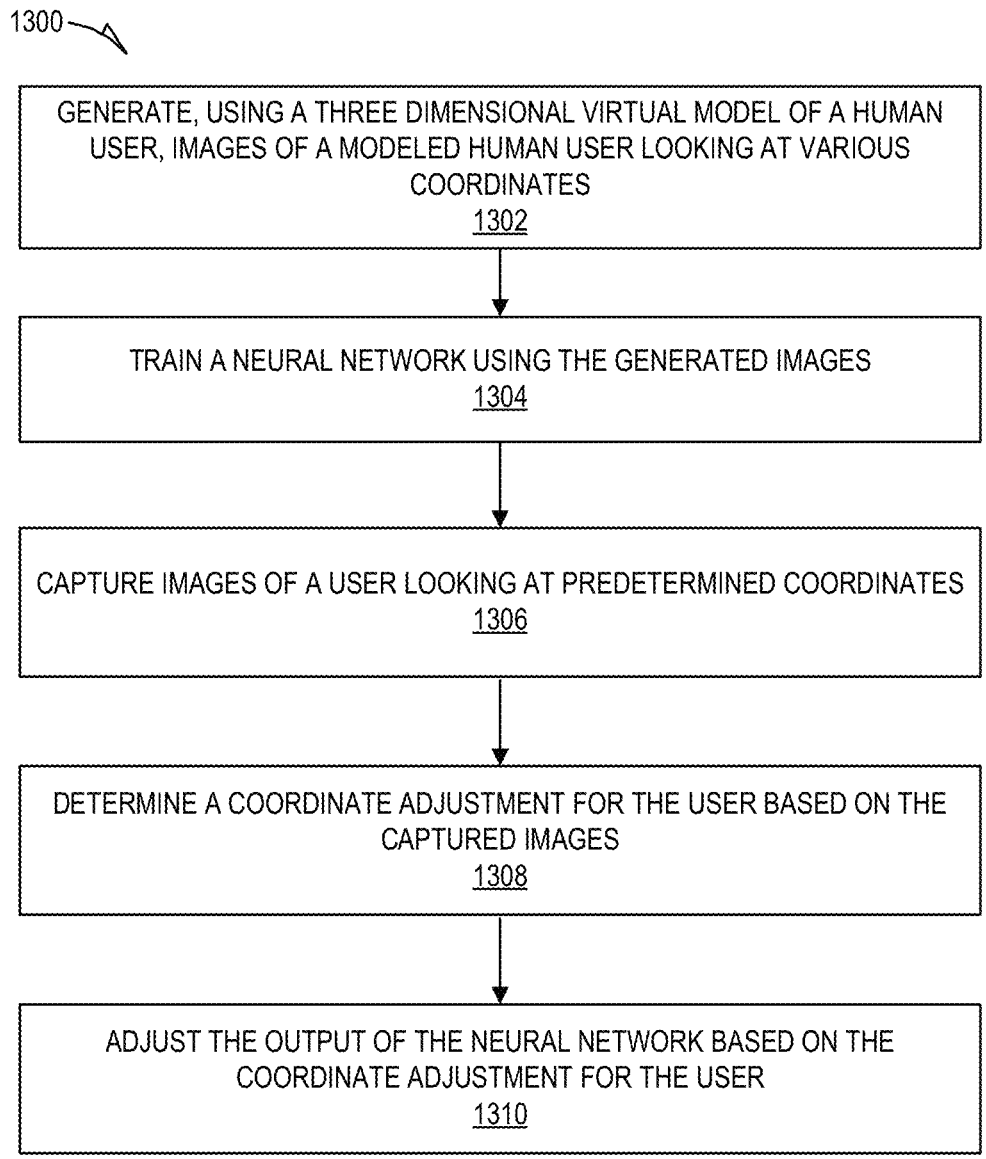
FIG. 13 is a flowchart showing a method for generating a neural network that determines the gaze of a user, according to some example embodiments.

FIG. 13 is a flowchart showing a method for generating a neural network that determines the gaze of a user, according to some example embodiments. The method 1300 may be embodied in computer readable instructions for execution by one or more processors such that the operations of the method 1300 may be performed in part or in whole by the model generation module 116; accordingly, the method 1300 is described below by way of example with reference thereto. However, it shall be appreciated that at least some of the operations of the method 1300 may be deployed on various other hardware configurations and the method 1300 is not intended to be limited the model generation module 116.

At operation 1302, the training data generation module 604 generates, using a three dimensional virtual model of a human user, images of a modeled human user looking at various coordinates. The training data generation module 604 uses the generated model of the human user to generate training data for a neural network that determines the gaze of a user based on an image of the user's eyes. To generate the neural network, training data consisting of images of users looking at various locations is needed to train the neural network. Gathering this type of training data may be time consuming and cumbersome. Accordingly, the training data generation module 604 uses the generated model of the human user to generate training data for a neural network. That is, the training data generation module 604 generates images of the virtual human user looking at various coordinates. Each generated image includes metadata indicating a coordinate value that the virtual human user is looking at in the image. The training data generation module 604 modifies the features, pose, and/or orientation of the virtual human user to generate varied training data.

At operation 1304, the model training module 606 trains a neural network using the generated images. The training data includes images of a virtual user looking at various coordinates. Each image includes metadata describing the coordinates at which the virtual user in the image is looking. The resulting neural network outputs estimated coordinates at which a user is looking based on an input image of a user's eyes.

At operation 1306, the user configuration module 608 captures images of a user looking at predetermined coordinates, and at operation 1308, the user configuration module 608 determines a coordinate adjustment for the user based on the captured images. The user configuration module 608 gathers user data used to configure the neural network to a specified user. While the training data generated by the training data generation module 604 is used to train the neural network, it results in a general model rather than a model that is configured for a specified user. That is, the training data used to train the neural network does not include images of the specific user. The user configuration module 608 gathers images of the user looking at known coordinates, which is used to configure the neural network to the specified user. The user configuration module 608 causes visual indicators to be presented on the display of the client device 104, and prompts the user to look at the visual indicators. The user configuration module 608 captures images of the user looking at the various presented visual indicators. Each visual indicator is presented at a known coordinate, which results in image data of the specific user looking at known coordinates.

At operation 1310, the model modification module 610 adjusts the output of the neural network based on the coordinate adjustment for the user. That is, the model modification module 610 generates a personalized version of the neural network for the specified user that is configured based on the images of the specified user. The model modification module 610 uses an image of the user captured by the user configuration module 608 as input in the neural network and then compares the resulting output of the neural network to the known coordinates at which the user was looking in the image. The model modification module 610 may then configure the neural network to adjust the output of the neural network for the user based on any determined variance between the output of the neural network and the known coordinates at which the user was looking in the image.

Figure 14:
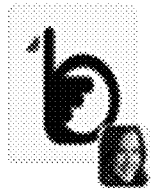
FIG. 14 is a screenshot, according to some example embodiments.

FIG. 14 is a screenshot, according to some example embodiments. As shown, the user is prompted to authorize access to their social networking account. The user can choose to authorize or deny access.

Figure 15:
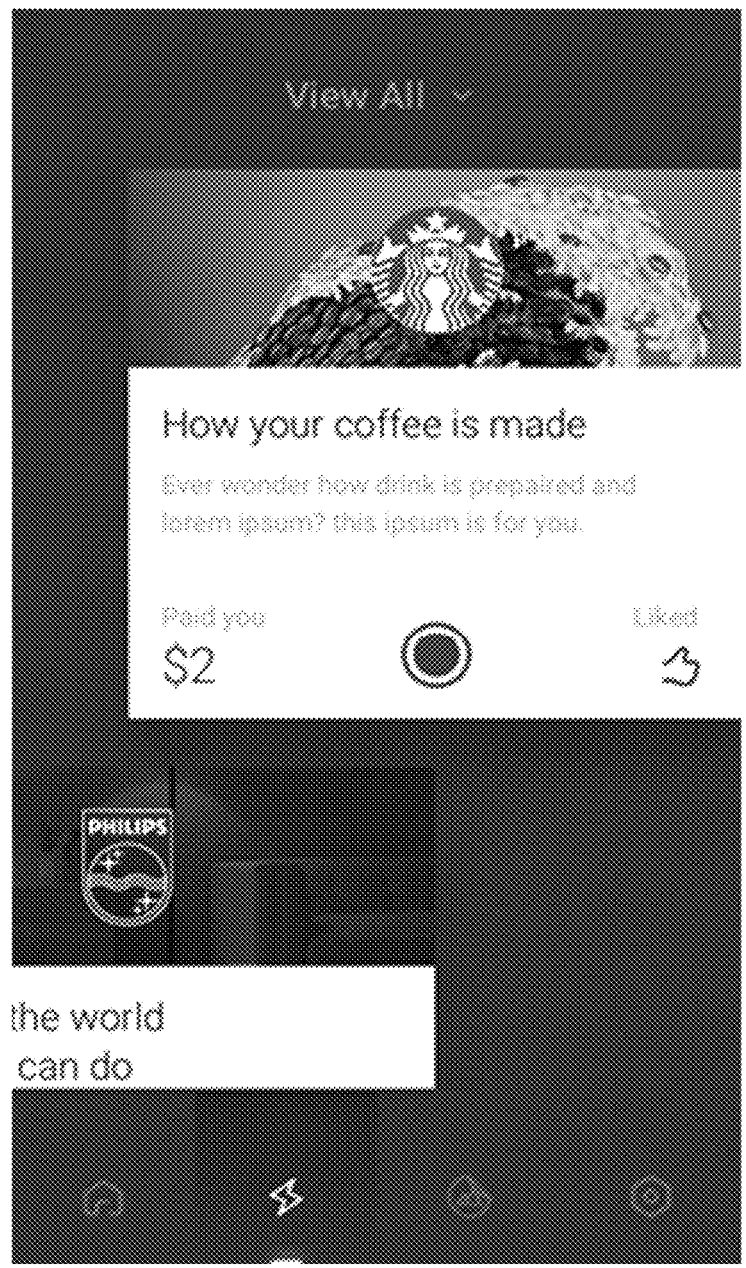
FIG. 15 is a screenshot, according to some example embodiments.

FIG. 15 is a screenshot, according to some example embodiments. As shown, the user is prompted to view an invitational content item regarding how coffee is made. The user is offered a monetary reward of two dollars to view the invitational content item. The user can select to accept or deny the offer.

Figure 16:
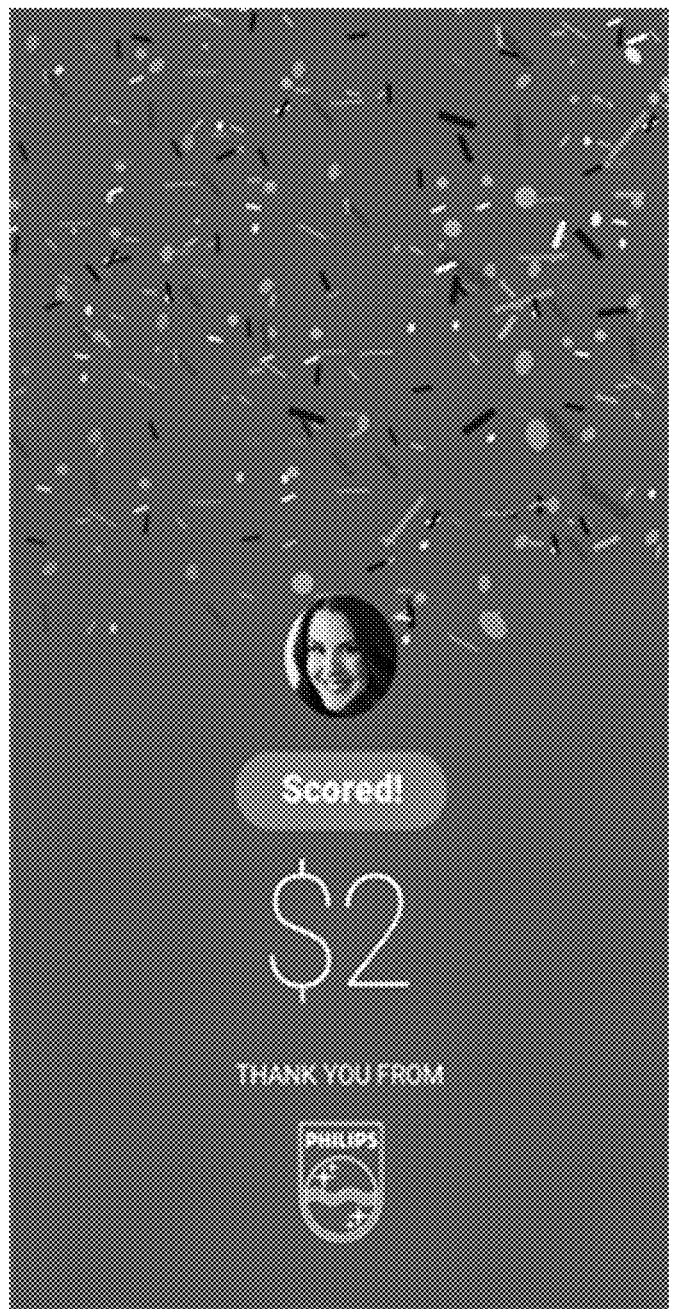
FIG. 16 is a screenshot, according to some example embodiments.

FIG. 16 is a screenshot, according to some example embodiments. As shown, the user is provided with a confirmation that the monetary award of two dollars has been awarded to the user.

Figure 17:
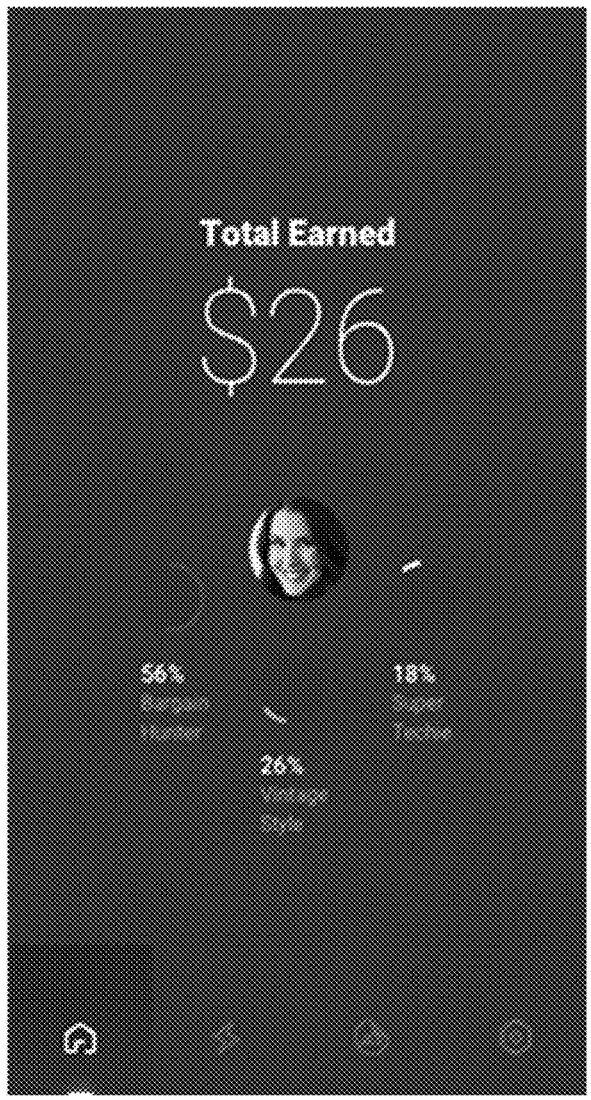
FIG. 17 is a screenshot, according to some example embodiments.

FIG. 17 is a screenshot, according to some example embodiments. As shown, the user is presented with a summary of the total monetary awards (i.e., twenty six dollars) that have been awarded to the user. The user is also provided with metrics regarding the types of invitational content items the user has viewed to receive the awards.

Figure 18:
FIG. 18 is a screenshot, according to some example embodiments.

FIG. 18 is a screenshot, according to some example embodiments. As shown, an invitational content item is presented as virtual reality (VR) over images of the user's environment. The advertised product is a lightbulb that changes colors. The lightbulb is presented over real time images of the user's environment captured by the client device 104. The invitational content item allows the user to adjust the color of the bulb, causing the presentation of the invitational content item to adjust accordingly.

Figure 19:
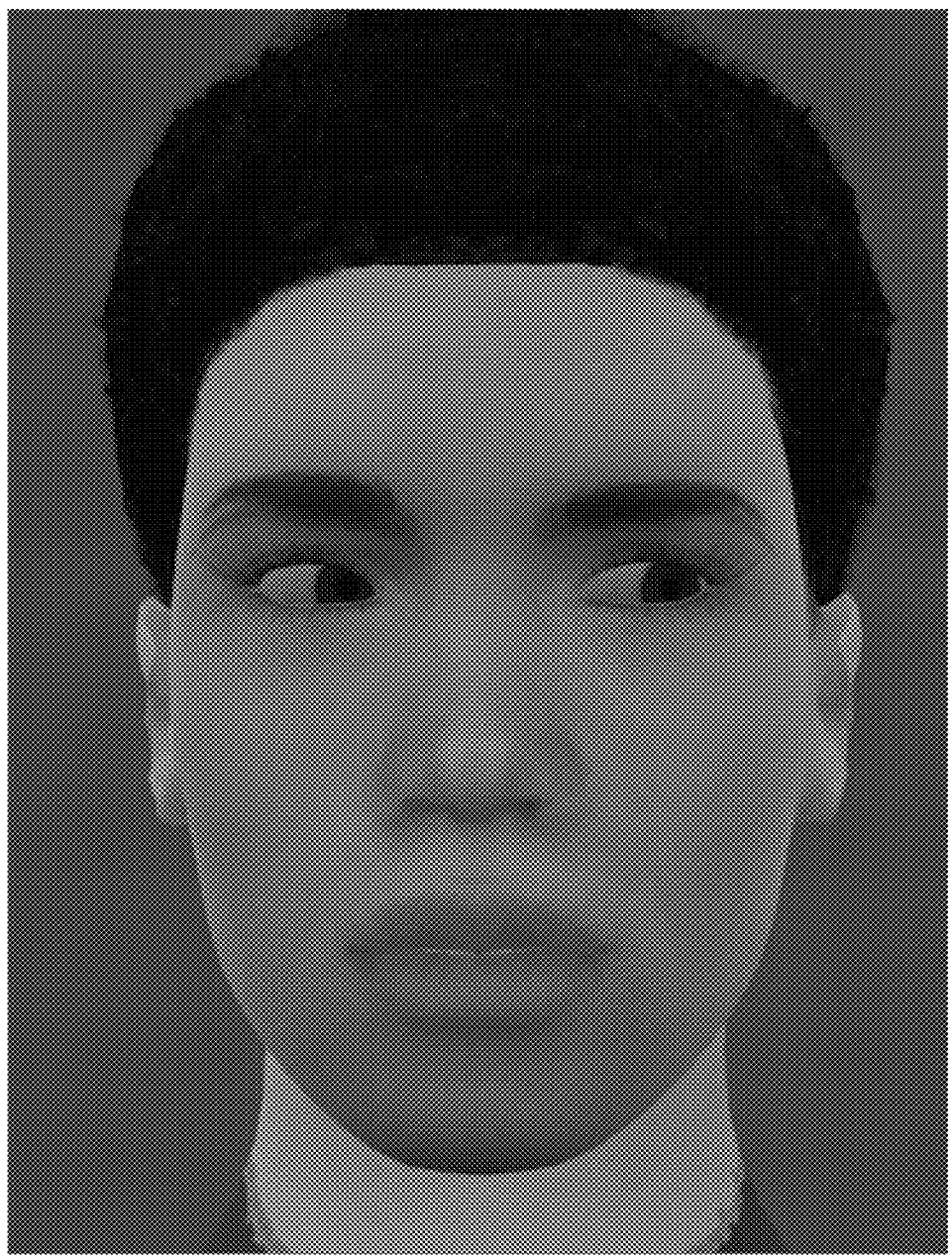
FIG. 19 shows a training image of a virtual human user, according to some example embodiments.

FIG. 19 shows a training image of a virtual human user, according to some example embodiments. As shown, an image of a virtual user is generated based on a three-dimensional model of a human user. The shown virtual user has their gaze set to know coordinates. The coordinate data is associated with the training image as metadata, and both are used to train a neural network. Using images of a virtual user allows for a large amount of training data to be easily and quickly generated.

Figure 20:
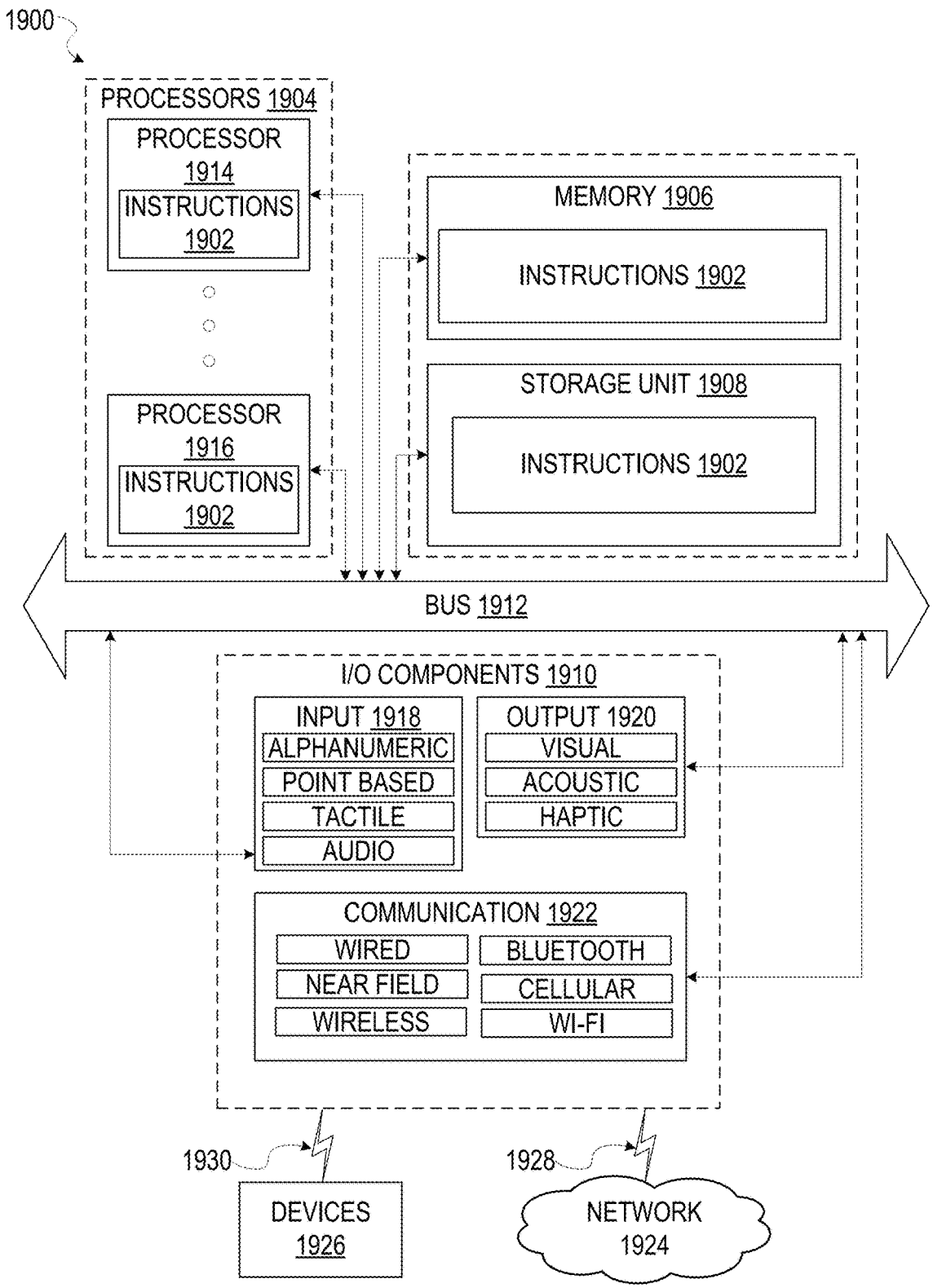
FIG. 20 shows a diagrammatic representation of a computing device in the example form of a computer system within which a set of instructions for causing the computing device to perform any one or more of the methodologies discussed herein may be executed.

FIG. 20 shows a block diagram illustrating components of a computing device 2000, according to some example embodiments, able to read instructions from a machine-readable medium (e.g., a machine-readable storage medium) and perform any one or more of the methodologies discussed herein. Specifically, FIG. 20 shows a diagrammatic representation of computing device 2000 in the example form of a system, within which instructions 2002 (e.g., software, a program, an application, an applet, an app, a driver, or other executable code) for causing computing device 2000 to perform any one or more of the methodologies discussed herein may be executed. For example, instructions 2002 include executable code that causes computing device 2000 to execute methods 700, 800, 900, 1000, 1100, 1200 and 1300. In this way, these instructions 2002 transform the general, non-programmed machine into a particular machine programmed to carry out the described and illustrated functions in the manner described herein. Computing device 2000 may operate as a standalone device or may be coupled (e.g., networked) to other machines.

By way of non-limiting example, computing device 2000 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing instructions 2002, sequentially or otherwise, that specify actions to be taken by computing device 2000. Further, while only a single computing device 2000 is illustrated, the term "machine" shall also be taken to include a collection of computing devices 2000 that individually or jointly execute instructions 2002 to perform any one or more of the methodologies discussed herein.

Computing device 2000 may include processors 2004, memory 2006, storage unit 2008 and I/O components 2010, which may be configured to communicate with each other such as via bus 2012.

Memory 2006 (e.g., a main memory or other memory storage) and storage unit 2008 are both accessible to processors 2004 such as via bus 2012. Memory 2006 and storage unit 2008 store instructions 2002 embodying any one or more of the methodologies or functions described herein. In some embodiments, database 2016 resides on storage unit 2008. Instructions 2002 may also reside, completely or partially, within memory 2006, within storage unit 2008, within at least one of processors 2004 (e.g., within the processor's cache memory), or any suitable combination thereof, during execution thereof by computing device 2000. Accordingly, memory 2006, storage unit 2008, and the memory of processors 2004 are examples of machine-readable media.

The I/O components 2010 may include a wide variety of components to receive input, provide output, produce output, transmit information, exchange information, capture measurements, and so on. The specific I/O components 2010 that are included in a particular machine will depend on the type of machine. For example, portable machines such as mobile phones will likely include a touch input device or other such input mechanisms, while a headless server machine will likely not include such a touch input device. It will be appreciated that I/O components 2010 may include many other components that are not specifically shown in FIG. 20. I/O components 2010 are grouped according to functionality merely for simplifying the following discussion and the grouping is in no way limiting. In various example embodiments, I/O components 2010 may include input components 2018 and output components 2020. Input components 2018 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. Output components 2020 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. I/O components 2010 may include communication components 2022 operable to couple computing device 2000 to network 2024 or devices 2026 via coupling 2028 and coupling 2030, respectively. For example, communication components 2022 may include a network interface component or other suitable device to interface with network 2024. In further examples, communication components 2022 may include wired communication components, wireless communication components, cellular communication components, near field communication (NFC) components, Bluetooth® components (e.g., Bluetooth® Low Energy), WiFi® components, and other communication components to provide communication via other modalities. The devices 1126 may be another machine or any of a wide variety of peripheral devices (e.g., a peripheral device coupled via a Universal Serial Bus (USB)).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network 2024.

In example embodiments, operations may be performed by one or more programmable processors 2004 executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network 2024. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
    generating, by a computing device, a three-dimensional virtual model of a human user, the three-dimensional virtual model of the human user including a pair of virtual eyes that are configurable to any set of coordinates from a set of configurable coordinates, each respective set of coordinates from the set of configurable coordinates causing the three-dimensional virtual model of the human user to gaze in a direction corresponding to the respective set of coordinates from the set of configurable coordinates;
    generating, using the three-dimensional virtual model of a human user, a set of training images depicting the three-dimensional virtual model of the human user gazing in different directions, wherein a first training image from the set of training images depicts the three-dimensional virtual model of the human user generated based on a first set of coordinates from the set of configurable coordinates and a second training image from the set of training images depicts the three-dimensional virtual model of the human user generated based on a second set of coordinates from the set of configurable coordinates;

generating a neural network based on the set of training images of the modeled human user looking at various coordinates; accessing at least one image of eyes of a human user, the at least one image captured while a client device presents a first content item on a display of the client device;

determining, based on using the at least one image as input in the neural network, gaze data indicating a gaze of the human user, the gaze data including coordinates at which the human user is looking in relation to the client device;

and determining, based on the gaze data, an engagement score for the human user, the engagement score indicating a level of engagement of the user with the first content item.

2. The method of claim 1, further comprising: accessing an image of the eyes of the human user looking at a predetermined coordinate on the display of the client device, the image of the eyes of the human user looking at the predetermined coordinate having been captured after the client device presents a prompt to the human user to look at the predetermined coordinate on the display; and determining, based on the image of the eyes of the human user looking at the predetermined coordinate on the display of the client device, a coordinate adjustment for the human user.

3. The method of claim 2, wherein determining the gaze data comprises: adjusting an output of the neural network based on the coordinate adjustment for the human user, yielding the gaze of the human user.

4. The method of claim 1, wherein determining the engagement score comprises: determining, based on the gaze of the human user, that the human user was viewing a relevant portion of the first content item while the first content item was presented on the display of the client device.

5. The method of claim 1, further comprising: prompting the human user to provide feedback regarding the first content item; and receiving feedback from the human user regarding the first content item, the feedback used to determine the engagement score.

6. The method of claim 1, further comprising: comparing the engagement score to a threshold engagement score; and in response to determining that the engagement score meets or transgresses the threshold engagement score, assigning a monetary credit to an account associated with the human user.

7. A system comprising:
one or more computer processors; and one or more computer-readable mediums storing instructions that, when executed by the one or more computer processors, cause the system to perform operations comprising:
generating a three-dimensional virtual model of a human user, the three-dimensional virtual model of the human user including a pair of virtual eyes that are configurable to any set of coordinates from a set of configurable coordinates, each respective set of coordinates from the set of configurable coordinates causing the three-dimensional virtual model of the human user to gaze in a direction corresponding to the respective set of coordinates from the set of configurable coordinates;

generating, using the three-dimensional virtual model of a human user, a set of training images depicting the three-dimensional virtual model of the human user gazing in different directions, wherein a first training image from the set of training images depicts the three-dimensional virtual model of the human user generated based on a first set of coordinates from the set of configurable coordinates and a second training image from the set of training images depicts the three-dimensional virtual model of the human user generated based on a second set of coordinates from the set of configurable coordinates;

generating a neural network based on the set of training images of the modeled human user looking at various coordinates;

accessing at least one image of eyes of a human user, the at least one image captured while a device presents a first content item on a display of the device;

determining, based on using the at least one image as input in the neural network, gaze data indicating a gaze of the human user, the gaze data including coordinates at which the human user is looking in relation to the client device;

and determining, based on the gaze data, an engagement score for the human user, the engagement score indicating a level of engagement of the user with the first content item.

8. The system of claim 7, the operations further comprising:
accessing an image of the eyes of the human user looking at a predetermined coordinate on the display of the device, the image of the eyes of the human user looking at the predetermined coordinate having been captured after the device presents a prompt to the human user to look at the predetermined coordinate on the display; and
determining, based on the image of the eyes of the human user looking at the predetermined coordinate on the display of the device, a coordinate adjustment for the human user.

9. The system of claim 8, wherein determining the gaze data comprises: adjusting an output of the neural network based on the coordinate adjustment for the human user, yielding the gaze of the human user.

10. The system of claim 7, wherein determining the engagement score comprises: determining, based on the gaze of the human user, that the human user was viewing a relevant portion of the first content item while the first content item was presented on the display of the device.

11. The system of claim 7, the operations further comprising:
prompting the human user to provide feedback regarding the first content item; and
receiving feedback from the human user regarding the first content item, the feedback used to determine the engagement score.

12. The system of claim 7, the operations further comprising:
comparing the engagement score to a threshold engagement score; and in response to determining that the engagement score meets or transgresses the threshold engagement score, assigning a monetary credit to an account associated with the human user.

13. A non-transitory computer-readable medium storing instructions that, when executed by one or more computer processors of a computing device, cause the computing device to perform operations comprising:
- generating a three-dimensional virtual model of a human user, the three-dimensional virtual model of the human user including a pair of virtual eyes that are configurable to any set of coordinates from a set of configurable coordinates, each respective set of coordinates from the set of configurable coordinates causing the three-dimensional virtual model of the human user to gaze in a direction corresponding to the respective set of coordinates from the set of configurable coordinates;
- generating, using the three-dimensional virtual model of a human user, a set of training images depicting the three-dimensional virtual model of the human user gazing in different directions, wherein a first training image from the set of training images depicts the three-dimensional virtual model of the human user generated based on a first set of coordinates from the set of configurable coordinates and a second training image from the set of training images depicts the three-dimensional virtual model of the human user generated based on a second set of coordinates from the set of configurable coordinates;
- generating a neural network based on the set of training images of the modeled human user looking at various coordinates;
- receiving, from a client device, at least one image of eyes of a human user, the at least one image captured while the client device presents a first content item on a display of the client device;
- determining, based on using the at least one image as input in the neural network, gaze data indicating a gaze of the human user, the gaze including coordinates at which the human user is looking in relation to the client device;
- and determining, based on the gaze of the human user, an engagement score for the human user, the engagement score indicating a level of engagement of the human user with the first content item.

14. The non-transitory computer-readable medium of claim 13, the operations further comprising: receiving, from the client device, an image of the eyes of the human user looking at a predetermined coordinate on the display of the client device, the image of the eyes of the human user looking at the predetermined coordinate having been captured after the client device presents a prompt to the human user to look at the predetermined coordinate on the display; and determining, based on the image of the eyes of the human user looking at the predetermined coordinate on the display of the client device, a coordinate adjustment for the human user.

15. The non-transitory computer-readable medium of claim 14, wherein determining the gaze data comprises: adjusting an output of the neural network based on the coordinate adjustment for the human user, yielding the gaze of the human user.

16. The non-transitory computer-readable medium of claim 13, wherein determining the engagement score comprises: determining, based on the gaze of the human user, that the human user was viewing a relevant portion of the first content item while the first content item was presented on the display of the client device.

17. The non-transitory computer-readable medium of claim 13, the operations further comprising: comparing the engagement score to a threshold engagement score; and in response to determining that the engagement score meets or transgresses the threshold engagement score, assigning a monetary credit to an account associated with the human user.

* * * * *